(12) United States Patent
Dhuse et al.

(10) Patent No.: US 9,135,098 B2
(45) Date of Patent: Sep. 15, 2015

(54) MODIFYING DISPERSED STORAGE NETWORK EVENT RECORDS

(75) Inventors: Greg Dhuse, Chicago, IL (US); Yogesh Ramesh Vedpathak, Chicago, IL (US)

(73) Assignee: Cleversafe, Inc., Chicago, IL (US)

( * ) Notice: Subject to any disclaimer, the term of this patent is extended or adjusted under 35 U.S.C. 154(b) by 212 days.

(21) Appl. No.: 13/548,033

(22) Filed: Jul. 12, 2012

(65) Prior Publication Data

US 2013/0031402 A1 Jan. 31, 2013

Related U.S. Application Data

(60) Provisional application No. 61/512,122, filed on Jul. 27, 2011.

(51) Int. Cl.
| | |
|---|---|
| *G06F 11/00* | (2006.01) |
| *G06F 11/07* | (2006.01) |
| *G06F 11/30* | (2006.01) |
| *G06F 11/10* | (2006.01) |
| *G06F 11/32* | (2006.01) |
| *G06F 11/34* | (2006.01) |

(52) U.S. Cl.
CPC .......... *G06F 11/0727* (2013.01); *G06F 11/079* (2013.01); *G06F 11/0769* (2013.01); *G06F 11/0778* (2013.01); *G06F 11/3006* (2013.01); *G06F 11/3034* (2013.01); *G06F 11/3072* (2013.01); *G06F 11/3086* (2013.01); *G06F 11/3419* (2013.01); *G06F 11/3476* (2013.01); *G06F 11/1076* (2013.01); *G06F 11/1092* (2013.01); *G06F 11/321* (2013.01); *G06F 11/3485* (2013.01)

(58) Field of Classification Search
CPC .. G06F 11/1076; G06F 3/067; H04L 67/1097
See application file for complete search history.

(56) References Cited

U.S. PATENT DOCUMENTS

| | | | |
|---|---|---|---|
| 4,092,732 A | 5/1978 | Ouchi | |
| 5,454,101 A | 9/1995 | Mackay et al. | |
| 5,485,474 A | 1/1996 | Rabin | |

(Continued)

OTHER PUBLICATIONS

International Search Report and Written Opinion; International Application No. PCT/US12/46544; Oct. 16, 2012; 7 pgs.

(Continued)

*Primary Examiner* — Christopher McCarthy
(74) *Attorney, Agent, or Firm* — Garlick & Markison; Timothy W. Markison

(57) ABSTRACT

A method begins by a dispersed storage (DS) processing module identifying a performance anomaly within a dispersed storage network (DSN). The method continues with the DS processing module identifying a set of collections of records corresponding to the performance anomaly, wherein one of the set of collections of records includes an event record including information regarding an event, a first record including information regarding a dispersed storage (DS) processing module processing an event request to produce a plurality of sub-event requests, and a plurality of records including information regarding a set of DS units processing the plurality of sub-event requests. The method continues with the DS processing module determining whether a reliable significance indication of the performance anomaly is determinable, and when the reliable significance indication of the performance anomaly is not determinable, modifying data collection criteria for one or more of the sets collections of records.

12 Claims, 22 Drawing Sheets

(56) References Cited

U.S. PATENT DOCUMENTS

| | | | |
|---|---|---|---|
| 5,774,643 A | 6/1998 | Lubbers et al. | |
| 5,802,364 A | 9/1998 | Senator et al. | |
| 5,809,285 A | 9/1998 | Hilland | |
| 5,890,156 A | 3/1999 | Rekieta et al. | |
| 5,987,622 A | 11/1999 | Lo Verso et al. | |
| 5,991,414 A | 11/1999 | Garay et al. | |
| 6,012,159 A | 1/2000 | Fischer et al. | |
| 6,058,454 A | 5/2000 | Gerlach et al. | |
| 6,128,277 A | 10/2000 | Bruck et al. | |
| 6,175,571 B1 | 1/2001 | Haddock et al. | |
| 6,192,472 B1 | 2/2001 | Garay et al. | |
| 6,256,688 B1 | 7/2001 | Suetaka et al. | |
| 6,272,658 B1 | 8/2001 | Steele et al. | |
| 6,301,604 B1 | 10/2001 | Nojima | |
| 6,356,949 B1 | 3/2002 | Katsandres et al. | |
| 6,366,995 B1 | 4/2002 | Vilkov et al. | |
| 6,374,336 B1 | 4/2002 | Peters et al. | |
| 6,415,373 B1 | 7/2002 | Peters et al. | |
| 6,418,539 B1 | 7/2002 | Walker | |
| 6,449,688 B1 | 9/2002 | Peters et al. | |
| 6,567,948 B2 | 5/2003 | Steele et al. | |
| 6,571,282 B1 | 5/2003 | Bowman-Amuah | |
| 6,609,223 B1 | 8/2003 | Wolfgang | |
| 6,718,361 B1 | 4/2004 | Basani et al. | |
| 6,760,808 B2 | 7/2004 | Peters et al. | |
| 6,785,768 B2 | 8/2004 | Peters et al. | |
| 6,785,783 B2 | 8/2004 | Buckland | |
| 6,826,711 B2 | 11/2004 | Moulton et al. | |
| 6,879,596 B1 | 4/2005 | Dooply | |
| 7,003,688 B1 | 2/2006 | Pittelkow et al. | |
| 7,024,451 B2 | 4/2006 | Jorgenson | |
| 7,024,609 B2 | 4/2006 | Wolfgang et al. | |
| 7,080,101 B1 | 7/2006 | Watson et al. | |
| 7,103,824 B2 | 9/2006 | Halford | |
| 7,103,915 B2 | 9/2006 | Redlich et al. | |
| 7,111,115 B2 | 9/2006 | Peters et al. | |
| 7,140,044 B2 | 11/2006 | Redlich et al. | |
| 7,146,644 B2 | 12/2006 | Redlich et al. | |
| 7,171,493 B2 | 1/2007 | Shu et al. | |
| 7,222,133 B1 | 5/2007 | Raipurkar et al. | |
| 7,240,236 B2 | 7/2007 | Cutts et al. | |
| 7,272,613 B2 | 9/2007 | Sim et al. | |
| 7,636,724 B2 | 12/2009 | de la Torre et al. | |
| 8,533,299 B2* | 9/2013 | Nightingale et al. | 709/220 |
| 2002/0062422 A1 | 5/2002 | Butterworth et al. | |
| 2002/0166079 A1 | 11/2002 | Ulrich et al. | |
| 2003/0018927 A1 | 1/2003 | Gadir et al. | |
| 2003/0037261 A1 | 2/2003 | Meffert et al. | |
| 2003/0065617 A1 | 4/2003 | Watkins et al. | |
| 2003/0084020 A1 | 5/2003 | Shu | |
| 2004/0024963 A1 | 2/2004 | Talagala et al. | |
| 2004/0122917 A1 | 6/2004 | Menon et al. | |
| 2004/0215998 A1 | 10/2004 | Buxton et al. | |
| 2004/0228493 A1 | 11/2004 | Ma | |
| 2005/0100022 A1 | 5/2005 | Ramprashad | |
| 2005/0114594 A1 | 5/2005 | Corbett et al. | |
| 2005/0125593 A1 | 6/2005 | Karpoff et al. | |
| 2005/0131993 A1* | 6/2005 | Fatula | 709/202 |
| 2005/0132070 A1 | 6/2005 | Redlich et al. | |
| 2005/0144382 A1 | 6/2005 | Schmisseur | |
| 2005/0229069 A1 | 10/2005 | Hassner et al. | |
| 2006/0047907 A1 | 3/2006 | Shiga et al. | |
| 2006/0136448 A1 | 6/2006 | Cialini et al. | |
| 2006/0156059 A1 | 7/2006 | Kitamura | |
| 2006/0224603 A1 | 10/2006 | Correll, Jr. | |
| 2007/0079081 A1 | 4/2007 | Gladwin et al. | |
| 2007/0079082 A1* | 4/2007 | Gladwin et al. | 711/154 |
| 2007/0079083 A1 | 4/2007 | Gladwin et al. | |
| 2007/0088970 A1 | 4/2007 | Buxton et al. | |
| 2007/0174192 A1 | 7/2007 | Gladwin et al. | |
| 2007/0214285 A1 | 9/2007 | Au et al. | |
| 2007/0234110 A1 | 10/2007 | Soran et al. | |
| 2007/0283167 A1 | 12/2007 | Venters, III et al. | |
| 2008/0104248 A1* | 5/2008 | Yahiro et al. | 709/226 |
| 2008/0183975 A1* | 7/2008 | Foster et al. | 711/153 |
| 2009/0094250 A1* | 4/2009 | Dhuse et al. | 707/10 |
| 2009/0094251 A1* | 4/2009 | Gladwin et al. | 707/10 |
| 2009/0094318 A1* | 4/2009 | Gladwin et al. | 709/203 |
| 2009/0157699 A1* | 6/2009 | Ohata et al. | 707/10 |
| 2010/0023524 A1* | 1/2010 | Gladwin et al. | 707/10 |
| 2010/0125763 A1* | 5/2010 | Yamamoto et al. | 714/54 |
| 2010/0332751 A1* | 12/2010 | Quigley et al. | 711/114 |
| 2011/0107103 A1 | 5/2011 | Dehaan et al. | |
| 2011/0161680 A1* | 6/2011 | Grube et al. | 713/193 |
| 2011/0231699 A1* | 9/2011 | Gladwin et al. | 714/6.2 |
| 2011/0231733 A1* | 9/2011 | Cilfone et al. | 714/763 |
| 2011/0289378 A1* | 11/2011 | Grube et al. | 714/760 |
| 2013/0311851 A1* | 11/2013 | Cilfone et al. | 714/763 |

OTHER PUBLICATIONS

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

Shamir; How to Share a Secret; Communications of the ACM; vol. 22, No. 11; Nov. 1979; pp. 612-613.

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

* cited by examiner computing system 10 event record 112

| reporting entity ID 114 | timestamp 122 | event ID 116 | sequence no. 124 | msg source 126 | parent event ID 118 other 128 |
|---|---|---|---|---|---|
| step 120 | | | | | |
| recv request | 15:03:49.354 | | 302 | user device 457 | - |
| process | 15:03:50.793 | | - | - | - |
| send response | 15:03:51.485 | | 302 | - | - |

FIG. 7A log record 130

| reporting entity ID 114 | timestamp 122 | state descriptor 134 | state parameters 136 |
|---|---|---|---|
| state 132 | | | |
| 1A | 15:03:49.354 | request received | slice name 2F5 |
| 2B | 15:03:50.793 | request processed | slice size 1k bytes |
| 3A | 15:03:51.485 | response sent | seq no. 302 |

FIG. 7B statistics record 138

| reporting entity ID 114 | timestamp 122 | quantified descriptor 1 | | ••• | quantified descriptor Q | |
|---|---|---|---|---|---|---|
| step 120 | | type 140 | value 142 | | type 140 | value 142 |
| recv request | 15:03:49.354 | errors | 0 | | rate | 15Mbps |
| process | 15:03:50.793 | loading | 35% | | cache | 2GB |
| send response | 15:03:51.485 | queue | 10% | | bandwidth | 10Mbps |

FIG. 7C

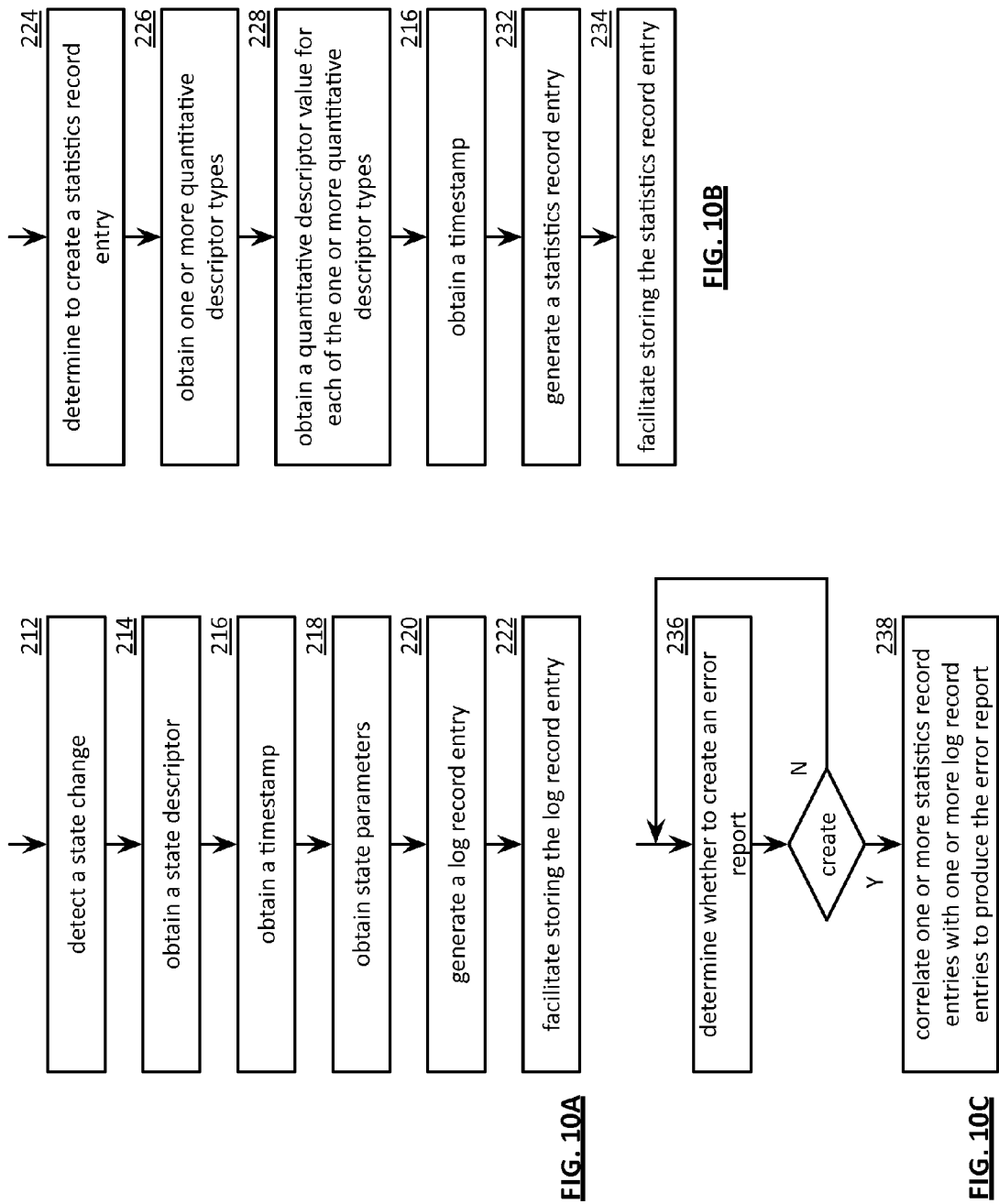

MODIFYING DISPERSED STORAGE NETWORK EVENT RECORDS

CROSS REFERENCE TO RELATED PATENTS

This patent application is claiming priority under 35 USC §119 to a provisionally filed patent application entitled PROCESSING EVENT INFORMATION IN A DISPERSED STORAGE NETWORK having a provisional filing date of Jul. 27, 2011, and a provisional Ser. No. of 61/512,122.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Technical Field of the Invention

This invention relates generally to computing systems and more particularly to data storage solutions within such computing systems.

2. Description of Related Art

Computers are known to communicate, process, and store data. Such computers range from wireless smart phones to data centers that support millions of web searches, stock trades, or on-line purchases every day. In general, a computing system generates data and/or manipulates data from one form into another. For instance, an image sensor of the computing system generates raw picture data and, using an image compression program (e.g., JPEG, MPEG, etc.), the computing system manipulates the raw picture data into a standardized compressed image.

With continued advances in processing speed and communication speed, computers are capable of processing real time multimedia data for applications ranging from simple voice communications to streaming high definition video. As such, general-purpose information appliances are replacing purpose-built communications devices (e.g., a telephone). For example, smart phones can support telephony communications but they are also capable of text messaging and accessing the internet to perform functions including email, web browsing, remote applications access, and media communications (e.g., telephony voice, image transfer, music files, video files, real time video streaming. etc.).

Each type of computer is constructed and operates in accordance with one or more communication, processing, and storage standards. As a result of standardization and with advances in technology, more and more information content is being converted into digital formats. For example, more digital cameras are now being sold than film cameras, thus producing more digital pictures. As another example, web-based programming is becoming an alternative to over the air television broadcasts and/or cable broadcasts. As further examples, papers, books, video entertainment, home video, etc. are now being stored digitally, which increases the demand on the storage function of computers.

A typical computer storage system includes one or more memory devices aligned with the needs of the various operational aspects of the computer's processing and communication functions. Generally, the immediacy of access dictates what type of memory device is used. For example, random access memory (RAM) memory can be accessed in any random order with a constant response time, thus it is typically used for cache memory and main memory. By contrast, memory device technologies that require physical movement such as magnetic disks, tapes, and optical discs, have a variable response time as the physical movement can take longer than the data transfer, thus they are typically used for secondary memory (e.g., hard drive, backup memory, etc.).

A computer's storage system will be compliant with one or more computer storage standards that include, but are not limited to, network file system (NFS), flash file system (FFS), disk file system (DFS), small computer system interface (SCSI), internet small computer system interface (iSCSI), file transfer protocol (FTP), and web-based distributed authoring and versioning (WebDAV). These standards specify the data storage format (e.g., files, data objects, data blocks, directories, etc.) and interfacing between the computer's processing function and its storage system, which is a primary function of the computer's memory controller.

Despite the standardization of the computer and its storage system, memory devices fail; especially commercial grade memory devices that utilize technologies incorporating physical movement (e.g., a disc drive). For example, it is fairly common for a disc drive to routinely suffer from bit level corruption and to completely fail after three years of use. One solution is to a higher-grade disc drive, which adds significant cost to a computer.

Another solution is to utilize multiple levels of redundant disc drives to replicate the data into two or more copies. One such redundant drive approach is called redundant array of independent discs (RAID). In a RAID device, a RAID controller adds parity data to the original data before storing it across the array. The parity data is calculated from the original data such that the failure of a disc will not result in the loss of the original data. For example, RAID 5 uses three discs to protect data from the failure of a single disc. The parity data, and associated redundancy overhead data, reduces the storage capacity of three independent discs by one third (e.g., n−1=capacity). RAID 6 can recover from a loss of two discs and requires a minimum of four discs with a storage capacity of n−2.

While RAID addresses the memory device failure issue, it is not without its own failures issues that affect its effectiveness, efficiency and security. For instance, as more discs are added to the array, the probability of a disc failure increases, which increases the demand for maintenance. For example, when a disc fails, it needs to be manually replaced before another disc fails and the data stored in the RAID device is lost. To reduce the risk of data loss, data on a RAID device is typically copied on to one or more other RAID devices. While this addresses the loss of data issue, it raises a security issue since multiple copies of data are available, which increases the chances of unauthorized access. Further, as the amount of data being stored grows, the overhead of RAID devices becomes a non-trivial efficiency issue.

BRIEF DESCRIPTION OF THE SEVERAL VIEWS OF THE DRAWING(S)

FIG. 7A is a diagram illustrating an example of an event record in accordance with the present invention;

FIG. 7B is a diagram illustrating an example of a log record in accordance with the present invention;

FIG. 7C is a diagram illustrating an example of a statistics record in accordance with the present invention;

FIG. 10A is a flowchart illustrating an example of generating a log record in accordance with the present invention;

FIG. 10B is a flowchart illustrating an example of generating a statistics record in accordance with the present invention;

FIG. 10C is a flowchart illustrating an example of correlating a statistics record and a log record in accordance with the present invention;

DETAILED DESCRIPTION OF THE INVENTION

Figure 1:
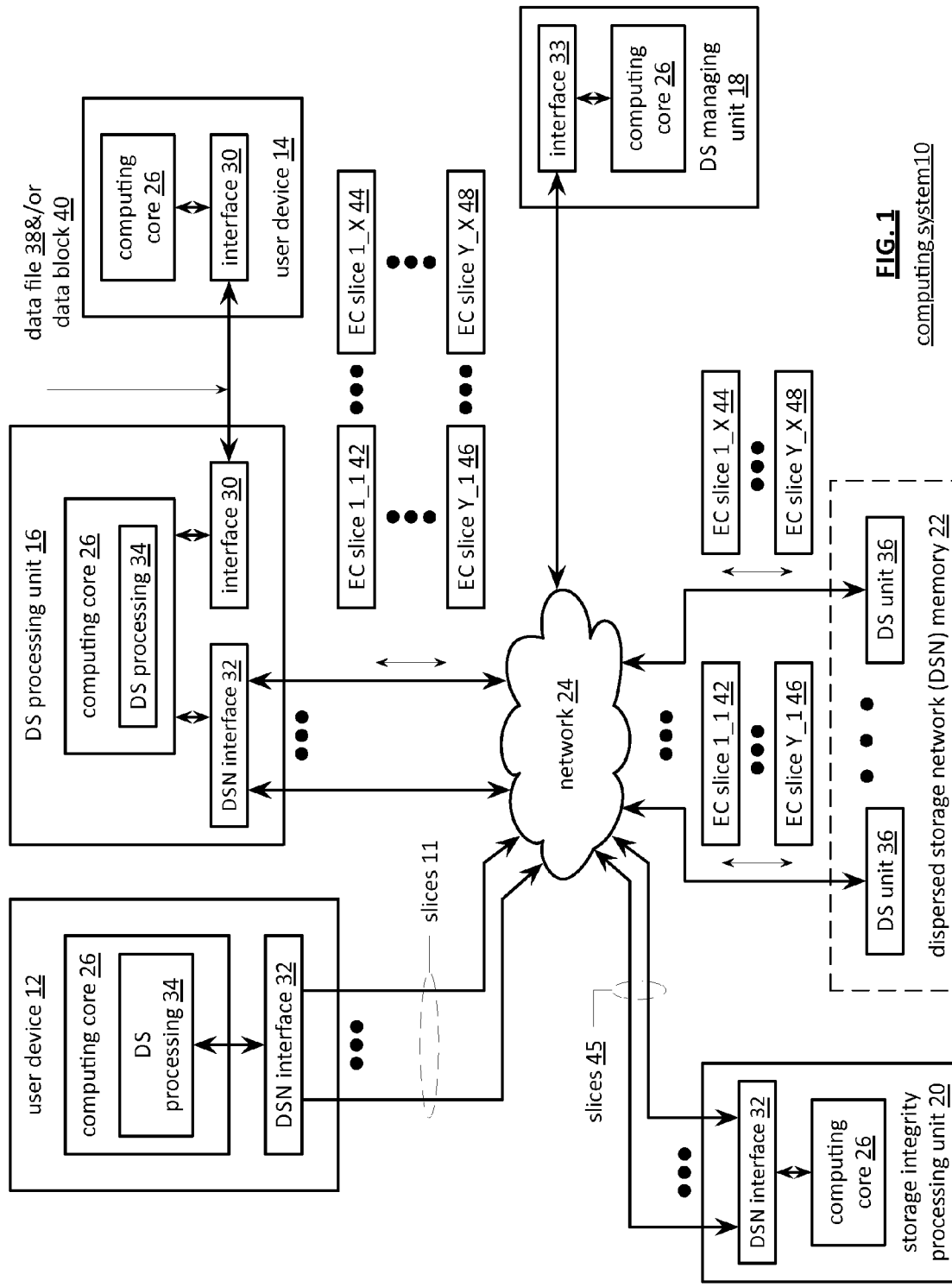
FIG. 1 is a schematic block diagram of an embodiment of a computing system in accordance with the present invention.

FIG. 1 is a schematic block diagram of a computing system 10 that includes one or more of a first type of user devices 12, one or more of a second type of user devices 14, at least one distributed storage (DS) processing unit 16, at least one DS managing unit 18, at least one storage integrity processing unit 20, and a distributed storage network (DSN) memory 22 coupled via a network 24. The network 24 may include one or more wireless and/or wire lined communication systems; one or more private intranet systems and/or public internet systems; and/or one or more local area networks (LAN) and/or wide area networks (WAN).

The DSN memory 22 includes a plurality of distributed storage (DS) units 36 for storing data of the system. Each of the DS units 36 includes a processing module and memory and may be located at a geographically different site than the other DS units (e.g., one in Chicago, one in Milwaukee, etc.).

Each of the user devices 12-14, the DS processing unit 16, the DS managing unit 18, and the storage integrity processing unit 20 may be a portable computing device (e.g., a social networking device, a gaming device, a cell phone, a smart phone, a personal digital assistant, a digital music player, a digital video player, a laptop computer, a handheld computer, a video game controller, and/or any other portable device that includes a computing core) and/or a fixed computing device (e.g., a personal computer, a computer server, a cable set-top box, a satellite receiver, a television set, a printer, a fax machine, home entertainment equipment, a video game console, and/or any type of home or office computing equipment). Such a portable or fixed computing device includes a computing core 26 and one or more interfaces 30, 32, and/or 33. An embodiment of the computing core 26 will be described with reference to FIG. 2.

With respect to the interfaces, each of the interfaces 30, 32, and 33 includes software and/or hardware to support one or more communication links via the network 24 indirectly and/or directly. For example, interfaces 30 support a communication link (wired, wireless, direct, via a LAN, via the network 24, etc.) between the first type of user device 14 and the DS processing unit 16. As another example, DSN interface 32 supports a plurality of communication links via the network 24 between the DSN memory 22 and the DS processing unit 16, the first type of user device 12, and/or the storage integrity processing unit 20. As yet another example, interface 33 supports a communication link between the DS managing unit 18 and any one of the other devices and/or units 12, 14, 16, 20, and/or 22 via the network 24.

In general and with respect to data storage, the system 10 supports three primary functions: distributed network data storage management, distributed data storage and retrieval, and data storage integrity verification. In accordance with these three primary functions, data can be distributedly stored in a plurality of physically different locations and subsequently retrieved in a reliable and secure manner regardless of failures of individual storage devices, failures of network equipment, the duration of storage, the amount of data being stored, attempts at hacking the data, etc.

The DS managing unit 18 performs distributed network data storage management functions, which include establishing distributed data storage parameters, performing network operations, performing network administration, and/or performing network maintenance. The DS managing unit 18 establishes the distributed data storage parameters (e.g., allocation of virtual DSN memory space, distributed storage parameters, security parameters, billing information, user profile information, etc.) for one or more of the user devices 12-14 (e.g., established for individual devices, established for a user group of devices, established for public access by the user devices, etc.). For example, the DS managing unit 18 coordinates the creation of a vault (e.g., a virtual memory block) within the DSN memory 22 for a user device (for a group of devices, or for public access). The DS managing unit 18 also determines the distributed data storage parameters for the vault. In particular, the DS managing unit 18 determines a number of slices (e.g., the number that a data segment of a data file and/or data block is partitioned into for distributed storage) and a read threshold value (e.g., the minimum number of slices required to reconstruct the data segment).

As another example, the DS managing module 18 creates and stores, locally or within the DSN memory 22, user profile information. The user profile information includes one or more of authentication information, permissions, and/or the security parameters. The security parameters may include one or more of encryption/decryption scheme, one or more encryption keys, key generation scheme, and data encoding/decoding scheme.

As yet another example, the DS managing unit 18 creates billing information for a particular user, user group, vault access, public vault access, etc. For instance, the DS managing unit 18 tracks the number of times user accesses a private vault and/or public vaults, which can be used to generate a per-access bill. In another instance, the DS managing unit 18 tracks the amount of data stored and/or retrieved by a user device and/or a user group, which can be used to generate a per-data-amount bill.

The DS managing unit 18 also performs network operations, network administration, and/or network maintenance. As at least part of performing the network operations and/or administration, the DS managing unit 18 monitors performance of the devices and/or units of the system 10 for potential failures, determines the devices and/or unit's activation status, determines the devices' and/or units' loading, and any other system level operation that affects the performance level of the system 10. For example, the DS managing unit 18 receives and aggregates network management alarms, alerts, errors, status information, performance information, and messages from the devices 12-14 and/or the units 16, 20, 22. For example, the DS managing unit 18 receives a simple network management protocol (SNMP) message regarding the status of the DS processing unit 16.

The DS managing unit 18 performs the network maintenance by identifying equipment within the system 10 that needs replacing, upgrading, repairing, and/or expanding. For example, the DS managing unit 18 determines that the DSN memory 22 needs more DS units 36 or that one or more of the DS units 36 needs updating.

The second primary function (i.e., distributed data storage and retrieval) begins and ends with a user device 12-14. For instance, if a second type of user device 14 has a data file 38 and/or data block 40 to store in the DSN memory 22, it send the data file 38 and/or data block 40 to the DS processing unit 16 via its interface 30. As will be described in greater detail with reference to FIG. 2, the interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data file 38 and/or data block 40.

The DS processing unit 16 receives the data file 38 and/or data block 40 via its interface 30 and performs a distributed storage (DS) process 34 thereon (e.g., an error coding dispersal storage function). The DS processing 34 begins by partitioning the data file 38 and/or data block 40 into one or more data segments, which is represented as Y data segments.

For example, the DS processing 34 may partition the data file 38 and/or data block 40 into a fixed byte size segment (e.g., $2^1$ to $2^n$ bytes, where n=>2) or a variable byte size (e.g., change byte size from segment to segment, or from groups of segments to groups of segments, etc.).

For each of the Y data segments, the DS processing 34 error encodes (e.g., forward error correction (FEC), information dispersal algorithm, or error correction coding) and slices (or slices then error encodes) the data segment into a plurality of error coded (EC) data slices 42-48, which is represented as X slices per data segment. The number of slices (X) per segment, which corresponds to a number of pillars n, is set in accordance with the distributed data storage parameters and the error coding scheme. For example, if a Reed-Solomon (or other FEC scheme) is used in an n/k system, then a data segment is divided into n slices, where k number of slices is needed to reconstruct the original data (i.e., k is the threshold). As a few specific examples, the n/k factor may be 5/3; 6/4; 8/6; 8/5; 16/10.

For each slice 42-48, the DS processing unit 16 creates a unique slice name and appends it to the corresponding slice 42-48. The slice name includes universal DSN memory addressing routing information (e.g., virtual memory addresses in the DSN memory 22) and user-specific information (e.g., user ID, file name, data block identifier, etc.).

The DS processing unit 16 transmits the plurality of EC slices 42-48 to a plurality of DS units 36 of the DSN memory 22 via the DSN interface 32 and the network 24. The DSN interface 32 formats each of the slices for transmission via the network 24. For example, the DSN interface 32 may utilize an internet protocol (e.g., TCP/IP, etc.) to packetize the slices 42-48 for transmission via the network 24.

The number of DS units 36 receiving the slices 42-48 is dependent on the distributed data storage parameters established by the DS managing unit 18. For example, the DS managing unit 18 may indicate that each slice is to be stored in a different DS unit 36. As another example, the DS managing unit 18 may indicate that like slice numbers of different data segments are to be stored in the same DS unit 36. For example, the first slice of each of the data segments is to be stored in a first DS unit 36, the second slice of each of the data segments is to be stored in a second DS unit 36, etc. In this manner, the data is encoded and distributedly stored at physically diverse locations to improved data storage integrity and security.

Each DS unit 36 that receives a slice 42-48 for storage translates the virtual DSN memory address of the slice into a local physical address for storage. Accordingly, each DS unit 36 maintains a virtual to physical memory mapping to assist in the storage and retrieval of data.

The first type of user device 12 performs a similar function to store data in the DSN memory 22 with the exception that it includes the DS processing. As such, the device 12 encodes and slices the data file and/or data block it has to store. The device then transmits the slices 11 to the DSN memory via its DSN interface 32 and the network 24.

For a second type of user device 14 to retrieve a data file or data block from memory, it issues a read command via its interface 30 to the DS processing unit 16. The DS processing unit 16 performs the DS processing 34 to identify the DS units 36 storing the slices of the data file and/or data block based on the read command. The DS processing unit 16 may also communicate with the DS managing unit 18 to verify that the user device 14 is authorized to access the requested data.

Assuming that the user device is authorized to access the requested data, the DS processing unit 16 issues slice read commands to at least a threshold number of the DS units 36 storing the requested data (e.g., to at least 10 DS units for a 16/10 error coding scheme). Each of the DS units 36 receiving the slice read command, verifies the command, accesses its virtual to physical memory mapping, retrieves the requested slice, or slices, and transmits it to the DS processing unit 16.

Once the DS processing unit 16 has received a read threshold number of slices for a data segment, it performs an error decoding function and de-slicing to reconstruct the data segment. When Y number of data segments has been reconstructed, the DS processing unit 16 provides the data file 38 and/or data block 40 to the user device 14. Note that the first type of user device 12 performs a similar process to retrieve a data file and/or data block.

The storage integrity processing unit 20 performs the third primary function of data storage integrity verification. In general, the storage integrity processing unit 20 periodically retrieves slices 45, and/or slice names, of a data file or data block of a user device to verify that one or more slices have not been corrupted or lost (e.g., the DS unit failed). The retrieval process mimics the read process previously described.

If the storage integrity processing unit 20 determines that one or more slices is corrupted or lost, it rebuilds the corrupted or lost slice(s) in accordance with the error coding scheme. The storage integrity processing unit 20 stores the rebuild slice, or slices, in the appropriate DS unit(s) 36 in a manner that mimics the write process previously described.

Figure 2:
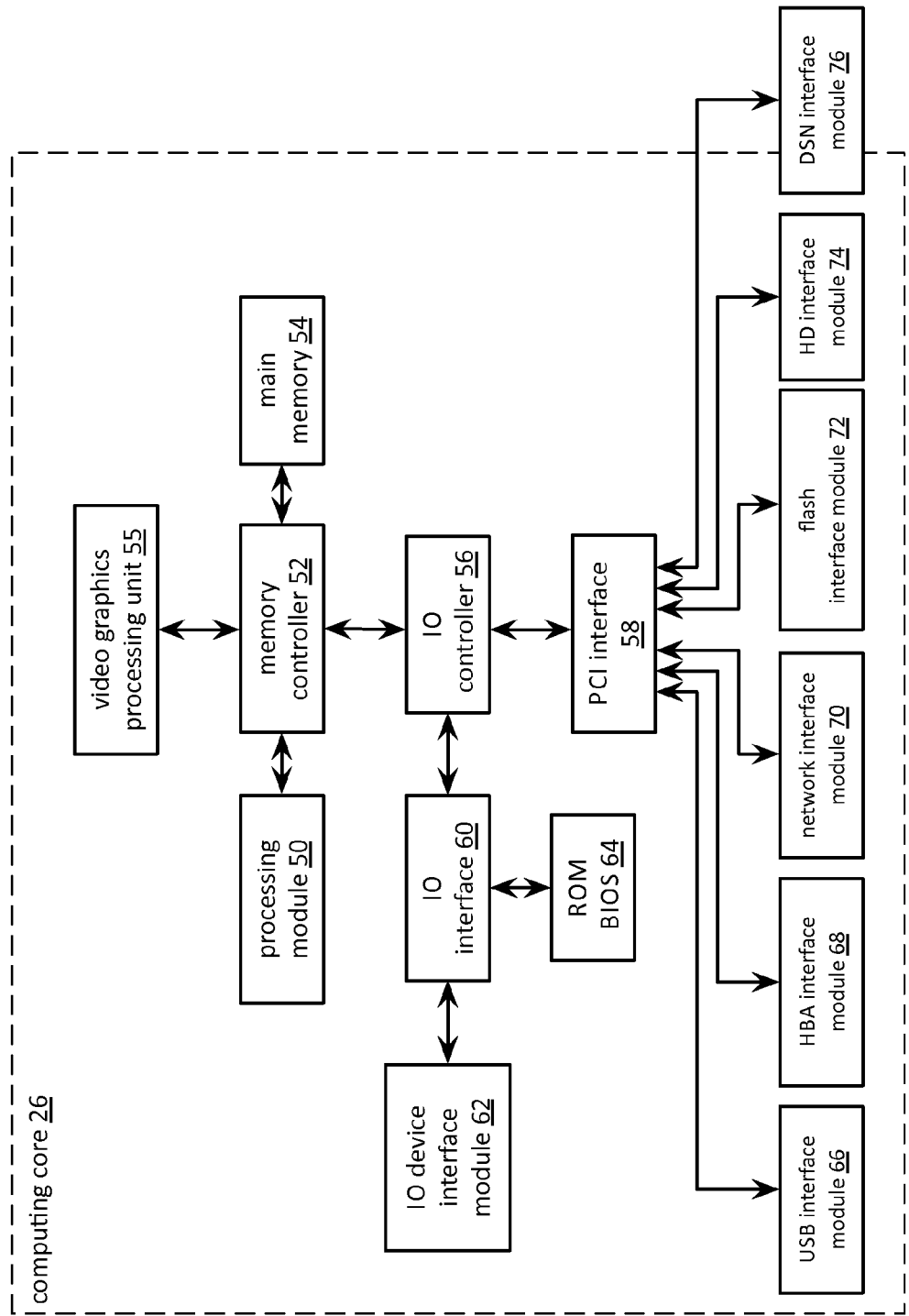
FIG. 2 is a schematic block diagram of an embodiment of a computing core in accordance with the present invention.

FIG. 2 is a schematic block diagram of an embodiment of a computing core 26 that includes a processing module 50, a memory controller 52, main memory 54, a video graphics processing unit 55, an input/output (I0) controller 56, a peripheral component interconnect (PCI) interface 58, at least one I0 device interface module 62, a read only memory (ROM) basic input output system (BIOS) 64, and one or more memory interface modules. The memory interface module(s) includes one or more of a universal serial bus (USB) interface module 66, a host bus adapter (HBA) interface module 68, a network interface module 70, a flash interface module 72, a hard drive interface module 74, and a DSN interface module 76. Note the DSN interface module 76 and/or the network interface module 70 may function as the interface 30 of the user device 14 of FIG. 1. Further note that the I0 device interface module 62 and/or the memory interface modules may be collectively or individually referred to as I0 ports.

Figure 3:
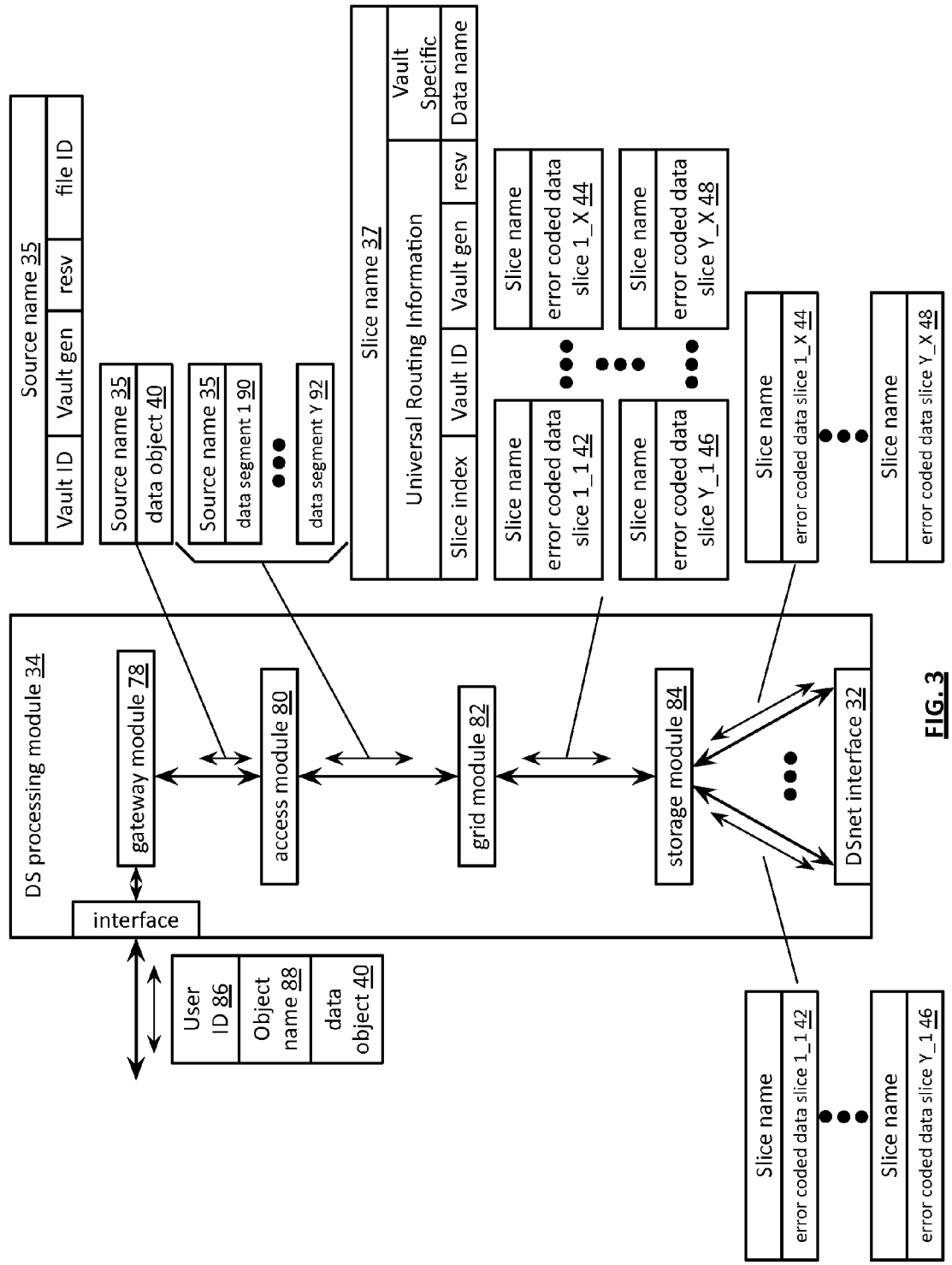
FIG. 3 is a schematic block diagram of an embodiment of a distributed storage processing unit in accordance with the present invention.

FIG. 3 is a schematic block diagram of an embodiment of a dispersed storage (DS) processing module 34 of user device 12 and/or of the DS processing unit 16. The DS processing module 34 includes a gateway module 78, an access module 80, a grid module 82, and a storage module 84. The DS processing module 34 may also include an interface 30 and the DSnet interface 32 or the interfaces 68 and/or 70 may be part of user 12 or of the DS processing unit 14. The DS processing module 34 may further include a bypass/feedback path between the storage module 84 to the gateway module 78. Note that the modules 78-84 of the DS processing module 34 may be in a single unit or distributed across multiple units.

In an example of storing data, the gateway module 78 receives an incoming data object that includes a user ID field 86, an object name field 88, and the data field 40 and may also receive corresponding information that includes a process identifier (e.g., an internal process/application ID), metadata, a file system directory, a block number, a transaction message, a user device identity (ID), a data object identifier, a source name, and/or user information. The gateway module 78 authenticates the user associated with the data object by verifying the user ID 86 with the managing unit 18 and/or another authenticating unit.

When the user is authenticated, the gateway module 78 obtains user information from the management unit 18, the user device, and/or the other authenticating unit. The user information includes a vault identifier, operational parameters, and user attributes (e.g., user data, billing information, etc.). A vault identifier identifies a vault, which is a virtual memory space that maps to a set of DS storage units 36. For example, vault 1 (i.e., user 1's DSN memory space) includes eight DS storage units (X=8 wide) and vault 2 (i.e., user 2's DSN memory space) includes sixteen DS storage units (X=16 wide). The operational parameters may include an error coding algorithm, the width n (number of pillars X or slices per segment for this vault), a read threshold T, a write threshold, an encryption algorithm, a slicing parameter, a compression algorithm, an integrity check method, caching settings, parallelism settings, and/or other parameters that may be used to access the DSN memory layer.

The gateway module 78 uses the user information to assign a source name 35 to the data. For instance, the gateway module 60 determines the source name 35 of the data object 40 based on the vault identifier and the data object. For example, the source name may contain a file identifier (ID), a vault generation number, a reserved field, and a vault identifier (ID). As another example, the gateway module 78 may generate the file ID based on a hash function of the data object 40. Note that the gateway module 78 may also perform message conversion, protocol conversion, electrical conversion, optical conversion, access control, user identification, user information retrieval, traffic monitoring, statistics generation, configuration, management, and/or source name determination.

The access module 80 receives the data object 40 and creates a series of data segments 1 through Y 90-92 in accordance with a data storage protocol (e.g., file storage system, a block storage system, and/or an aggregated block storage system). The number of segments Y may be chosen or randomly assigned based on a selected segment size and the size of the data object. For example, if the number of segments is chosen to be a fixed number, then the size of the segments varies as a function of the size of the data object. For instance, if the data object is an image file of 4,194,304 eight bit bytes (e.g., 33,554,432 bits) and the number of segments Y=131, 072, then each segment is 256 bits or 32 bytes. As another example, if segment sized is fixed, then the number of segments Y varies based on the size of data object. For instance, if the data object is an image file of 4,194,304 bytes and the fixed size of each segment is 4,096 bytes, the then number of segments Y=1,024. Note that each segment is associated with the same source name.

The grid module 82 receives the data segments and may manipulate (e.g., compression, encryption, cyclic redundancy check (CRC), etc.) each of the data segments before performing an error coding function of the error coding dispersal storage function to produce a pre-manipulated data segment. After manipulating a data segment, if applicable, the grid module 82 error encodes (e.g., Reed-Solomon, Convolution encoding, Trellis encoding, etc.) the data segment or manipulated data segment into X error coded data slices 42-44.

The value X, or the number of pillars (e.g., X=16), is chosen as a parameter of the error coding dispersal storage function. Other parameters of the error coding dispersal function include a read threshold T, a write threshold W, etc. The read threshold (e.g., T=10, when X=16) corresponds to the minimum number of error-free error coded data slices required to reconstruct the data segment. In other words, the DS processing module 34 can compensate for X−T (e.g., 16-10=6) missing error coded data slices per data segment. The write threshold W corresponds to a minimum number of DS storage units that acknowledge proper storage of their respective data slices before the DS processing module indicates proper storage of the encoded data segment. Note that the write threshold is greater than or equal to the read threshold for a given number of pillars (X).

For each data slice of a data segment, the grid module 82 generates a unique slice name 37 and attaches it thereto. The slice name 37 includes a universal routing information field and a vault specific field and may be 48 bytes (e.g., 24 bytes for each of the universal routing information field and the vault specific field). As illustrated, the universal routing information field includes a slice index, a vault ID, a vault generation, and a reserved field. The slice index is based on the pillar number and the vault ID and, as such, is unique for each pillar (e.g., slices of the same pillar for the same vault for any segment will share the same slice index). The vault specific field includes a data name, which includes a file ID and a segment number (e.g., a sequential numbering of data segments 1-Y of a simple data object or a data block number).

Prior to outputting the error coded data slices of a data segment, the grid module may perform post-slice manipulation on the slices. If enabled, the manipulation includes slice level compression, encryption, CRC, addressing, tagging, and/or other manipulation to improve the effectiveness of the computing system.

When the error coded data slices of a data segment are ready to be outputted, the grid module 82 determines which of the DS storage units 36 will store the EC data slices based on a dispersed storage memory mapping associated with the user's vault and/or DS storage unit attributes. The DS storage unit attributes may include availability, self-selection, performance history, link speed, link latency, ownership, available DSN memory, domain, cost, a prioritization scheme, a centralized selection message from another source, a lookup table, data ownership, and/or any other factor to optimize the operation of the computing system. Note that the number of DS storage units 36 is equal to or greater than the number of pillars (e.g., X) so that no more than one error coded data slice of the same data segment is stored on the same DS storage unit 36. Further note that EC data slices of the same pillar number but of different segments (e.g., EC data slice 1 of data segment 1 and EC data slice 1 of data segment 2) may be stored on the same or different DS storage units 36.

The storage module 84 performs an integrity check on the outbound encoded data slices and, when successful, identifies a plurality of DS storage units based on information provided by the grid module 82. The storage module 84 then outputs the encoded data slices 1 through X of each segment 1 through Y to the DS storage units 36. Each of the DS storage units 36 stores its EC data slice(s) and maintains a local virtual DSN address to physical location table to convert the virtual DSN address of the EC data slice(s) into physical storage addresses.

In an example of a read operation, the user device 12 and/or 14 sends a read request to the DS processing unit 14, which authenticates the request. When the request is authentic, the DS processing unit 14 sends a read message to each of the DS storage units 36 storing slices of the data object being read. The slices are received via the DSnet interface 32 and processed by the storage module 84, which performs a parity check and provides the slices to the grid module 82 when the parity check was successful. The grid module 82 decodes the slices in accordance with the error coding dispersal storage function to reconstruct the data segment. The access module 80 reconstructs the data object from the data segments and the gateway module 78 formats the data object for transmission to the user device.

Figure 4:
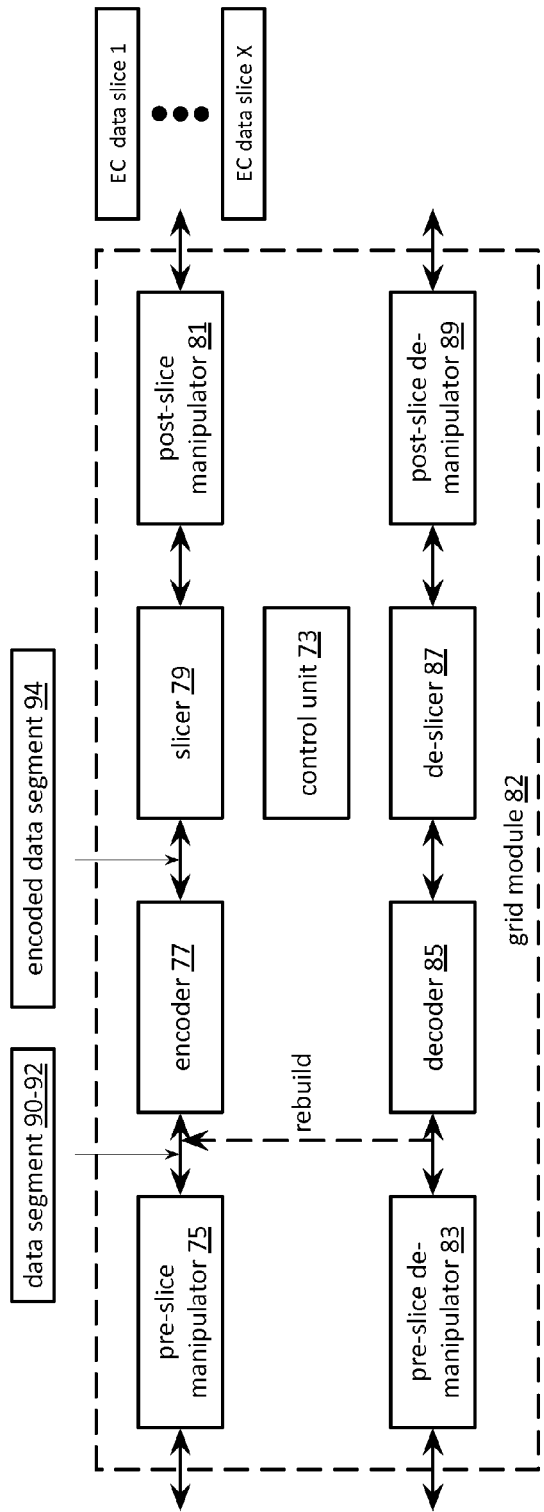
FIG. 4 is a schematic block diagram of an embodiment of a grid module in accordance with the present invention.

FIG. 4 is a schematic block diagram of an embodiment of a grid module 82 that includes a control unit 73, a pre-slice manipulator 75, an encoder 77, a slicer 79, a post-slice manipulator 81, a pre-slice de-manipulator 83, a decoder 85, a de-slicer 87, and/or a post-slice de-manipulator 89. Note that the control unit 73 may be partially or completely external to the grid module 82. For example, the control unit 73 may be part of the computing core at a remote location, part of a user device, part of the DS managing unit 18, or distributed amongst one or more DS storage units.

In an example of write operation, the pre-slice manipulator 75 receives a data segment 90-92 and a write instruction from an authorized user device. The pre-slice manipulator 75 determines if pre-manipulation of the data segment 90-92 is required and, if so, what type. The pre-slice manipulator 75 may make the determination independently or based on instructions from the control unit 73, where the determination is based on a computing system-wide predetermination, a table lookup, vault parameters associated with the user identification, the type of data, security requirements, available DSN memory, performance requirements, and/or other metadata.

Once a positive determination is made, the pre-slice manipulator 75 manipulates the data segment 90-92 in accordance with the type of manipulation. For example, the type of manipulation may be compression (e.g., Lempel-Ziv-Welch, Huffman, Golomb, fractal, wavelet, etc.), signatures (e.g., Digital Signature Algorithm (DSA), Elliptic Curve DSA, Secure Hash Algorithm, etc.), watermarking, tagging, encryption (e.g., Data Encryption Standard, Advanced Encryption Standard, etc.), adding metadata (e.g., time/date stamping, user information, file type, etc.), cyclic redundancy check (e.g., CRC32), and/or other data manipulations to produce the pre-manipulated data segment.

The encoder 77 encodes the pre-manipulated data segment 92 using a forward error correction (FEC) encoder (and/or other type of erasure coding and/or error coding) to produce an encoded data segment 94. The encoder 77 determines which forward error correction algorithm to use based on a predetermination associated with the user's vault, a time based algorithm, user direction, DS managing unit direction, control unit direction, as a function of the data type, as a function of the data segment 92 metadata, and/or any other factor to determine algorithm type. The forward error correction algorithm may be Golay, Multidimensional parity, Reed-Solomon, Hamming, Bose Ray Chauduri Hocquenghem (BCH), Cauchy-Reed-Solomon, or any other FEC encoder. Note that the encoder 77 may use a different encoding algorithm for each data segment 92, the same encoding algorithm for the data segments 92 of a data object, or a combination thereof.

The encoded data segment 94 is of greater size than the data segment 92 by the overhead rate of the encoding algorithm by a factor of X/T, where X is the width or number of slices, and T is the read threshold. In this regard, the corresponding decoding process can accommodate at most X−T missing EC data slices and still recreate the data segment 92. For example, if X=16 and T=10, then the data segment 92 will be recoverable as long as 10 or more EC data slices per segment are not corrupted.

The slicer 79 transforms the encoded data segment 94 into EC data slices in accordance with the slicing parameter from the vault for this user and/or data segment 92. For example, if the slicing parameter is X=16, then the slicer 79 slices each encoded data segment 94 into 16 encoded slices.

The post-slice manipulator 81 performs, if enabled, post-manipulation on the encoded slices to produce the EC data slices. If enabled, the post-slice manipulator 81 determines the type of post-manipulation, which may be based on a computing system-wide predetermination, parameters in the vault for this user, a table lookup, the user identification, the type of data, security requirements, available DSN memory, performance requirements, control unit directed, and/or other metadata. Note that the type of post-slice manipulation may include slice level compression, signatures, encryption, CRC, addressing, watermarking, tagging, adding metadata, and/or other manipulation to improve the effectiveness of the computing system.

In an example of a read operation, the post-slice de-manipulator 89 receives at least a read threshold number of EC data slices and performs the inverse function of the post-slice manipulator 81 to produce a plurality of encoded slices. The de-slicer 87 de-slices the encoded slices to produce an encoded data segment 94. The decoder 85 performs the inverse function of the encoder 77 to recapture the data segment 90-92. The pre-slice de-manipulator 83 performs the inverse function of the pre-slice manipulator 75 to recapture the data segment 90-92.

Figure 5:
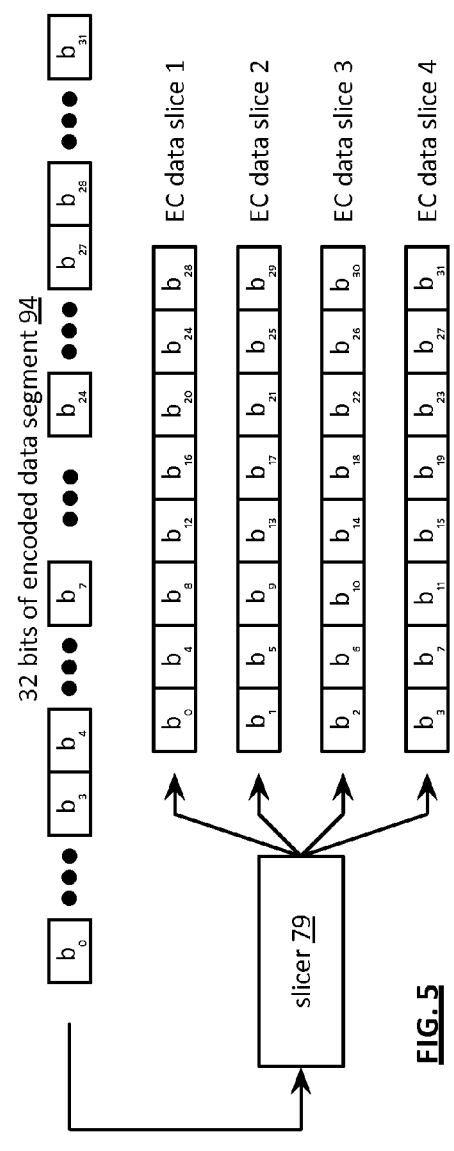
FIG. 5 is a diagram of an example embodiment of error coded data slice creation in accordance with the present invention.

FIG. 5 is a diagram of an example of slicing an encoded data segment 94 by the slicer 79. In this example, the encoded data segment 94 includes thirty-two bits, but may include more or less bits. The slicer 79 disperses the bits of the encoded data segment 94 across the EC data slices in a pattern as shown. As such, each EC data slice does not include consecutive bits of the data segment 94 reducing the impact of consecutive bit failures on data recovery. For example, if EC data slice 2 (which includes bits 1, 5, 9, 13, 17, 25, and 29) is unavailable (e.g., lost, inaccessible, or corrupted), the data segment can be reconstructed from the other EC data slices (e.g., 1, 3 and 4 for a read threshold of 3 and a width of 4).

Figure 6:
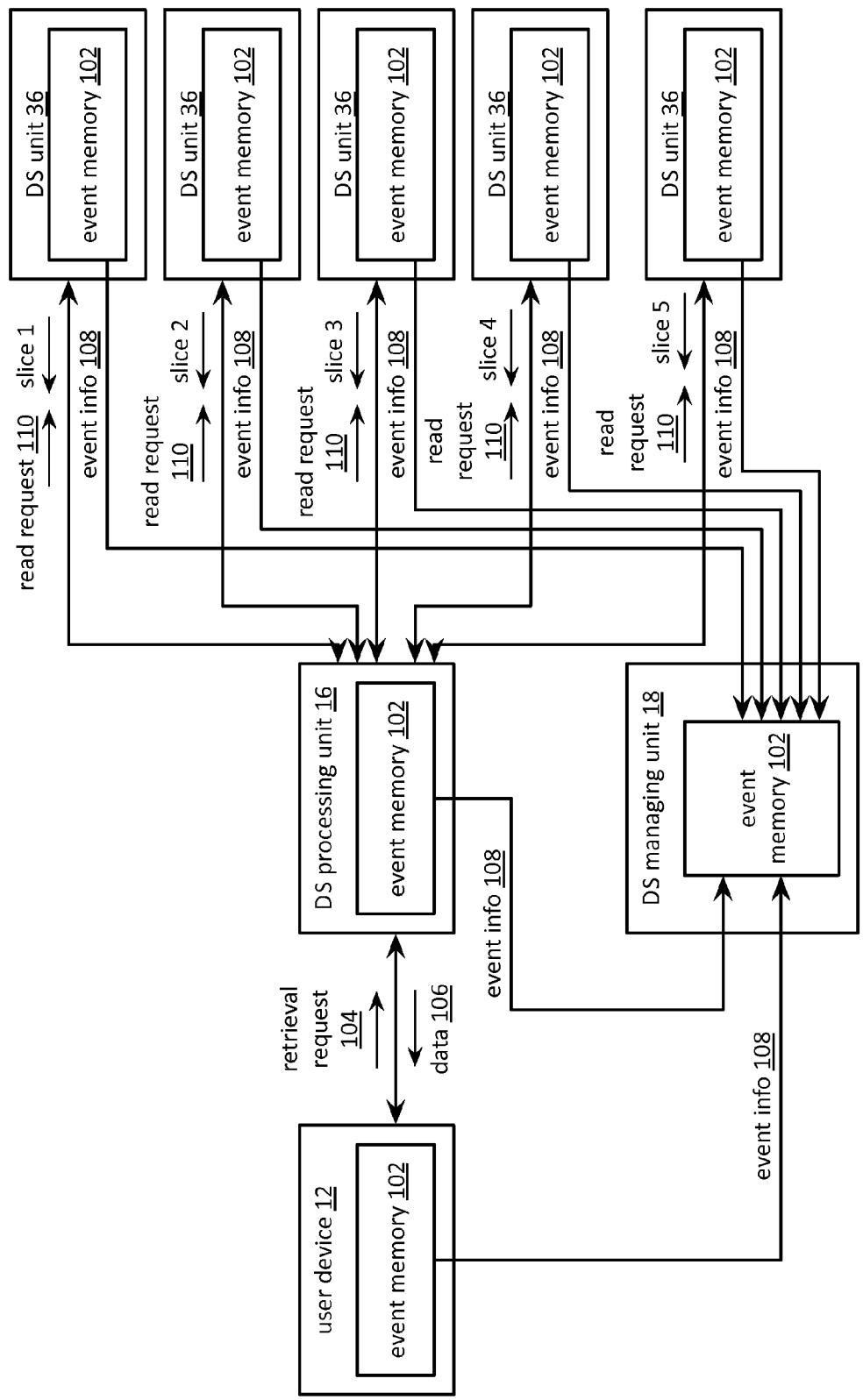
FIG. 6 is a schematic block diagram of another embodiment of a computing system in accordance with the present invention.

FIG. 6 is a schematic block diagram of another embodiment of a computing system that includes a user device 12, a dispersed storage (DS) processing unit 16, a DS managing unit 18, and a plurality of DS units 36 of a dispersed storage network (DSN). Each of the user device 12, the DS processing unit 16, the DS managing unit 18, and the plurality of DS units 36 may include an event memory 102. The event memory 102 may be implemented as a single memory device, a plurality of memory devices, and/or embedded circuitry of a processing module. The memory device may be a read-only memory, random access memory, volatile memory, non-volatile memory, static memory, dynamic memory, flash memory, cache memory, magnetic disk memory, optical disk memory, and/or any device that stores digital information. The event memory 102 stores event information 108 including one or more of event records, log records, and statistics records.

Each of the user device 12, the DS processing unit 16, the DS managing unit 18, and the plurality of DS units 36 store and/or retrieve event information 108 from any one or more of the event memories 102 of the system. The event information 108 may be subsequently utilized to document and/or analyze operation and/or performance of the computing system. Any element of the system may receive event information 108 from any other element of the system, aggregate the received event information 108 to produce aggregated event information, analyze the aggregated event information, and produce an analysis with regards to performance of the DSN. For example, the user device 12, the DS processing unit 16, and the plurality of DS units 36 process transactions of the computing system, generate event information 108, store the event information 108 in an associated event memory 102, and send the event information 108 to the DS managing unit 18 for aggregation and analysis. The event records, log records, and statistics records are discussed in greater detail with reference to FIGS. 7A-7C.

In an example of operation, user device 12 sends a retrieval request 104 to the DS processing unit 16, generates retrieval request event information 108, and stores the retrieval request event information 108 in the event memory 102 of the user device 12. The DS processing unit 16 receives the retrieval request 104, generates received retrieval request event information 108, and stores the received retrieval request event information 108 in the event memory 102 of the DS processing unit 16. The DS processing unit 16 processes the retrieval request 104 to generate a plurality of read requests 110, generates read request processing event information 108 (e.g., for each request), and stores the read request processing event information 108 in the event memory 102 of the DS processing unit 16. The DS processing unit 16 sends the plurality of read requests 110 to the plurality of DS units 36, generates read request sending event information 108 (e.g., for each request), and stores the read request sending event information 108 in the event memory 102 of the DS processing unit 16. Each DS unit 36 of the plurality of DS units 36 receives a read request 110 of the plurality of read requests, generates received read request event information 108, and stores the received read request event information 108 in the event memory 102 of the DS unit 36. The DS unit 36 processes the read request 110 to retrieve a slice, generates slice retrieval processing event information 108, and stores the slice retrieval processing event information 108 in the event memory 102 of the DS unit 36. The DS unit 36 sends a read response that includes the retrieved slice to DS processing unit 16, generates read response event information 108, and stores the read response event information 108 in the event memory of the DS unit 36.

Continuing with the example of operation, the DS processing unit 16 receives a read response from each DS unit 36 of the plurality of DS units 36 to produce a plurality of slices 1-5. The DS processing unit 16 generates received read response event information 108 corresponding to each of the received slices 1-5 and stores the read response event information 108 in the event memory 102 of the DS processing unit 16. The DS processing unit 16 processes the received slices 1-5 by decoding them to reproduce data 106. The DS processing unit 16 generates decoding event information 108 and stores the decoding event information 108 in the event memory 102 of the DS processing unit 16. The DS processing unit 16 sends a retrieval response that includes the data 106 to the user device 12, generates retrieval response event information, and stores the retrieval response event information in the event memory of the DS processing unit 16. The user device 12 receives the retrieval response, generates received data event information 108, and stores the received data event information 108 in the event memory 102 associated with the user device 12.

Further continuing with the example of operation, each of the user device 12, the DS processing unit 16, and the plurality of DS units 36 send event information 108 to the DS managing unit 18. The DS managing unit 18 collects and stores event information 108 in the event memory 102 of the DS managing unit 18. The DS managing unit 18 receives an analysis query from a requesting entity, retrieves event information 108 from the event memory 102 of DS managing unit 18, aggregates the event information 108, analyzes the event information 108 in accordance with the analysis query to produce an analysis, generates a representation of the analysis, and sends the representation to the requesting entity.

FIG. 7A is a diagram illustrating an example of an event record 112 that includes a reporting entity identifier (ID) field 114, an event ID field 116, a parent event ID field 118, and a table including a step field 120, a timestamp field 122, a sequence number field 124, a message source field 126, and a other field 128. The event record 112 may be associated with an event record ID. The reporting entity ID field 114 includes a reporting entity ID entry signifying an entity generating the event record 112. For example, reporting entity ID field 114 includes an entry of ID=2 when the reporting entity is DS unit 2. The event ID field 116 includes an event ID entry signifying an ID of a common event subsequently utilized to correlate event information from two or more reporting entities. For example, DS unit 2 and user device 3 create an event record utilizing event ID=54 when DS unit 2 and user device 3 perform steps associated with a common transaction. The parent event ID field 118 includes a parent event ID entry signifying an ID of an event that initialized the present event. For example, DS unit 4 receives a read request of event ID=20 and spawns a new event ID=21 to authenticate the read request. The DS unit 4 generates an event record for event ID=21 that includes a parent event ID=20. Newly spawned events may spawn even more children events resulting in multiple layers of events. Multiple layers of events are discussed in greater detail with reference to FIG. 8.

The step field 120 includes a step entry describing a step of the event. For example, the step may be a received request step, a processing step, a send response step, an authentication step, etc. The timestamp field 122 includes a timestamp entry associated with the step. The sequence number field 124 includes a sequence number entry of a protocol message between two or more elements of a computing system. The message source field 126 includes a message source entry identifier of a system element sending an associated message. The other field 128 includes another entry for additional information associated with the step. The other entry includes one or more of a slice name, a source name, a transaction number, a system element hardware ID, a software version number, a software pointer, a log record ID, and a statistics record ID.

FIG. 7B is a diagram illustrating an example of a log record 130 that includes a reporting entity identifier (ID) field 114, a table including a state field 132, a timestamp field 122, a state descriptor field 134, and a state parameters field 136. The log record 130 may be associated with a log record ID. The state field 132 includes a state entry signifying a state of one or more of a software process, an event, a system state, a transaction, and a sequence. The state descriptor field 134 includes a state descriptor entry qualitatively describing an associated state. For example, request received, request process, response sent, authentication request, authentication approved, memory available, system error, etc. The state parameters field 136 includes a state parameter entry signifying additional information associated with the associated state. For example, a slice name, a slice size indicator, a sequence number, a transaction number, a software line, a software breakpoint indicator, a message ID, a requester Internet protocol address, etc.

FIG. 7C is a diagram illustrating an example of a statistics record 138 that includes a reporting entity identifier (ID) field 114 and a table including a step field 120, a timestamp field 122, and one or more quantified descriptor fields 1-Q. Each quantified descriptor field includes a type field 140 and a value field 142. The statistics record 138 may be associated with a statistics record ID. The type field 140 includes a type entry describing an associate value type. For example, a number of errors, a loading factor, a bandwidth utilization factor, a memory utilization factor, a reliability indicator, and availability indicator, a queue depth indicator, a bandwidth indicator, a cache availability indicator, a data rate indicator, etc. The value field 142 includes a quantitative value entry of the associated type of quantified descriptor.

Figure 8:
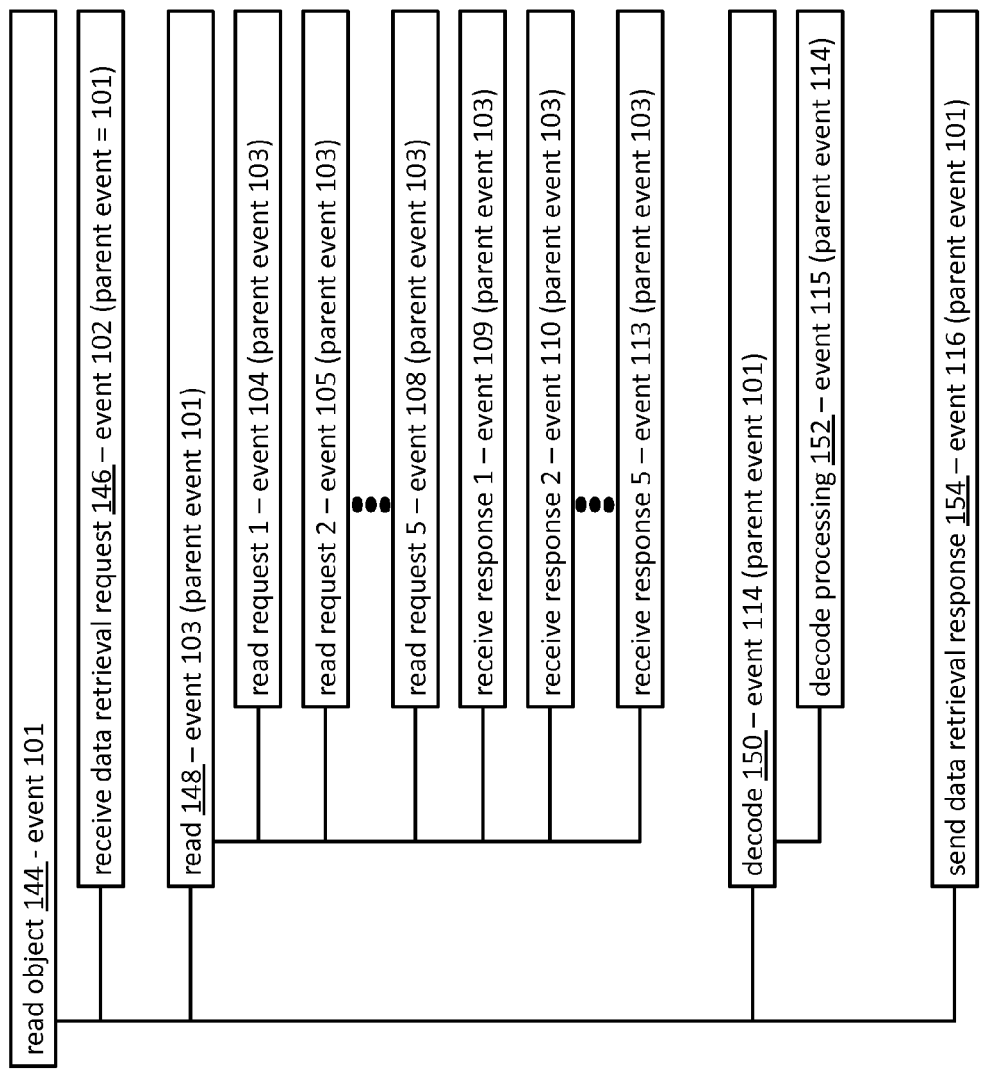
FIG. 8 is a diagram illustrating an example of a hierarchal event record representation in accordance with the present invention.

FIG. 8 is a diagram illustrating an example of a hierarchal event record representation that includes a time sequential representation of an event. The time sequential representation includes one or more children events associated with the event. A child event of the one or more children events associated with the event is one layer removed from the event and is represented by one indentation from the event towards the right. A child event may include one or more children events (e.g., grandchildren) associated with the child event. A grandchild event of the child event is two layers removed from the event and is represented by two indentations from the event towards the right. A still further child event may be at any layer removed from the event.

The representation may include a plurality of event information records (e.g., one or more of an event record, a log record, a statistics record), wherein each event record includes at least an event identifier (ID) and a parent event ID when the event ID of the event record is associated with a child event. For example, a read object event 144 associated with a dispersed storage (DS) processing unit is assigned event ID=101 is associated with a plurality of children events including a received data retrieval request 146 event ID=102, a read 148 event ID=103, a decode 150 event ID=114, and a send data retrieval response 154 event ID=116. Each child event of the plurality of children events is associated with parent event ID=101.

Children events may include further children events. For example, the read 148 event ID=103 includes read request 1-5 children events IDs=104-108 and read response 1-5 events IDs 109-113 when a response is received from five dispersed storage (DS) units. As another example, the read 148 event ID32 103 includes read request 1-5 children events IDs=104-108 and read response 1-3 events IDs 109-111 when a response is received from three of five DS units. A subsequent analysis of the representation indicates that two slices were not received when the received response event includes read responses 1-3 (e.g., missing responses 4-5). As another child of child event example, the decode 150 event ID=114 includes a decode processing event ID=115. The read object 144 event 101 finishes with the send data retrieval response 154 event ID=116.

Figure 9A:
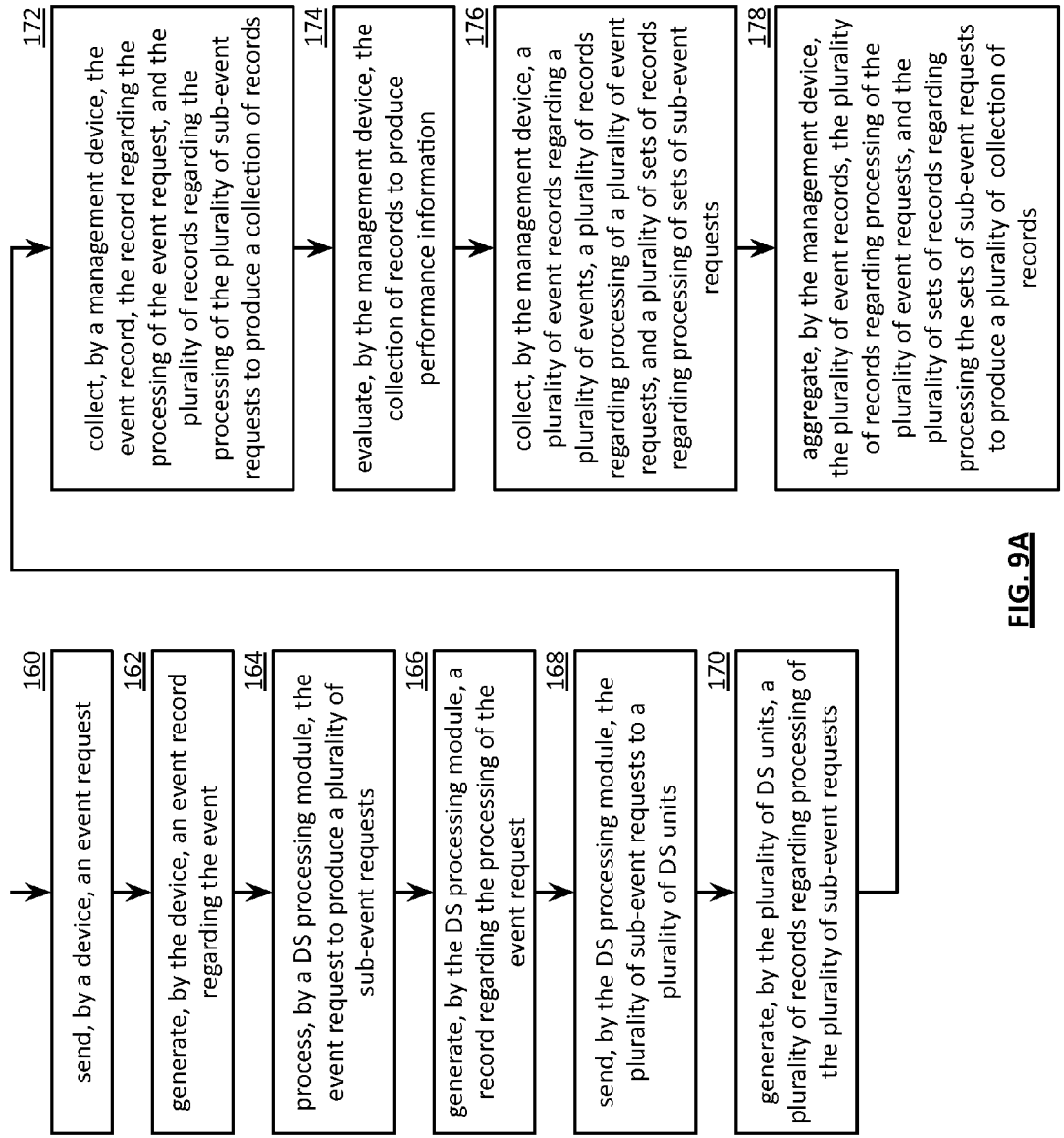
FIG. 9A is a flowchart illustrating an example of generating event records in accordance with the present invention.

FIG. 9A is a flowchart illustrating an example of generating event records. The method begins at step 160 where a processing module of a device affiliated with a dispersed storage network (DSN) sends an event request that identifies an event to a dispersed storage (DS) processing module. The event includes a user access operation or a system administrative operation. The user access operation includes a variety of operations such as a write operation, a read operation, and a delete operation. The system administrative operation includes a variety of operations such as a list operation, a list digest operation, and a scan for slice errors operation.

The method continues at step 162 where the device generates an event record regarding the event. The event record includes identity of the device, an event identifier (ID) associated with the event information regarding initiation of the event, and information regarding completion of the event. The generating includes generating the event ID based on one or more of a random number, a previous event ID, a retrieved event ID, and a received event ID (e.g., from a management device) in response to sending a query. The information regarding initiation of event and the information regarding completion event includes one or more of a timestamp, a step descriptor, a sequence number, a message source ID, a state descriptor, an operation type, and an associated error message ID. For example, the device generates the information regarding initiation of the event to include a step descriptor corresponding to sending a read object request and generates the information regarding completion of the event to include a step descriptor corresponding to receiving a data object in response to the read object request.

The method continues at step 164 where the DS processing module processes the event request to produce a plurality of sub-event requests. For example, the DS processing module produces a plurality of sets of read slice requests when the event request is a read data object request. The method continues at step 166 where the DS processing module generates a record regarding the processing of the event request. The record regarding the processing of the event request includes identity of the DS processing module, an event identifier (ID) associated with the processing of the event request (e.g., a newly generated unique event ID), a parent event ID associated with the event (e.g., the event ID associated with the event of the event request), information regarding initiation of the processing of the event request, and information regarding completion of the processing of the event request.

The information regarding initiation of the processing of the event request and the information regarding completion of the processing of the event request includes one or more of a timestamp, a step descriptor, a sequence number, a message source ID, a state descriptor, an operation type, and an associated error message ID. For example, the DS processing module generates the information regarding initiation of the processing of the event request to include a step descriptor corresponding to receiving the read object request and a step descriptor corresponding to outputting the plurality of sub-event requests. As another example, the DS processing module generates the information regarding completion of the processing of the event requests to include a step descriptor corresponding to receiving decode threshold number of encoded data slices, a step descriptor corresponding to decoding the decode threshold number of encoded data slices to produce a data segment, a step descriptor corresponding to aggregating a plurality of data segments, and a step descriptor corresponding to outputting a data object to the device.

The method continues at step 168 where the DS processing module sends the plurality of sub-event requests to a plurality of DS units of the DSN. The sending includes identifying the plurality of DS units. For example, the DS processing module selects a storage set of DS units for storage of a plurality of sets of encoded data slices and outputs the plurality of sub-event requests to the storage set of DS units.

The method continues at step 170 where the plurality of DS units generates a plurality of records regarding processing of the plurality of sub-event requests. A record of the plurality of records regarding the processing of the plurality of sub-event requests includes identity of one of the plurality of DS units, an event identifier (ID) associated with the processing of a corresponding one of the plurality of sub-event requests by the one of the plurality of DS units (e.g., a newly generated unique event ID), a parent event ID associated with the event request (e.g., the event ID of the event request), information regarding initiation of the processing of the corresponding one of the plurality of sub-event requests, and information regarding completion of the processing of the corresponding one of the plurality of sub-event requests. For example, a DS unit of the plurality of DS units generates a record to include information regarding initiation of the processing including a step descriptor corresponding to receiving the corresponding one of the plurality of sub-event requests and a step descriptor corresponding to retrieving an encoded data slice from memory of the DS unit when the corresponding one of the plurality of sub-event requests includes a read slice request. As another example, the DS unit of the plurality of DS units generates a record to include information regarding completion of the processing including a step descriptor corresponding to validating the retrieved encoded data slice to produce a validated encoded data slice and a step descriptor corresponding to sending the validated encoded data slice to the DS processing module.

The method continues at step 172 where a management device affiliated with the DSN collects the event record, the record regarding the processing of the event request, and the plurality of records regarding the processing of the plurality of sub-event requests to produce a collection of records. The collecting includes at least one of generating and sending a record request to one or more of the DS processing module and the plurality of DS units, receiving records from one or more of the DS processing module and the plurality of DS units, and retrieving the records from a local memory (e.g., retrieving a records file that includes previously received records).

The method continues at step 174 where the management device evaluates the collection of records to produce performance information regarding the DSN. The evaluating includes at least one of a performance response time of the DS processing unit and of one or more of the plurality of DS units, performance reliability of the DS processing unit and of the one or more of the plurality of DS units, and accessibility of the DS processing unit and of one or more of the plurality of DS units. For example, the management device calculates a difference between a timestamp of a record of information regarding initiation of the processing of the corresponding one of the plurality of sub-event requests and a timestamp of a record of information regarding completion of the processing of the corresponding one of the plurality of sub-event requests to produce a performance response time of the DS processing unit.

The method continues at step 176 where the management device collects a plurality of event records regarding a plurality of events, a plurality of records regarding processing of a plurality of event requests, and a plurality of sets of records regarding processing of sets of sub-event requests. A set of the sets of records is regarding the processing of a set of sub-event requests of one of the plurality of event requests. The method continues at step 178 where the management device aggregates the plurality of event records, the plurality of records regarding processing of the plurality of event requests, and the plurality of sets of records regarding processing the sets of sub-event requests to produce a plurality of collection of records.

Figure 9B:
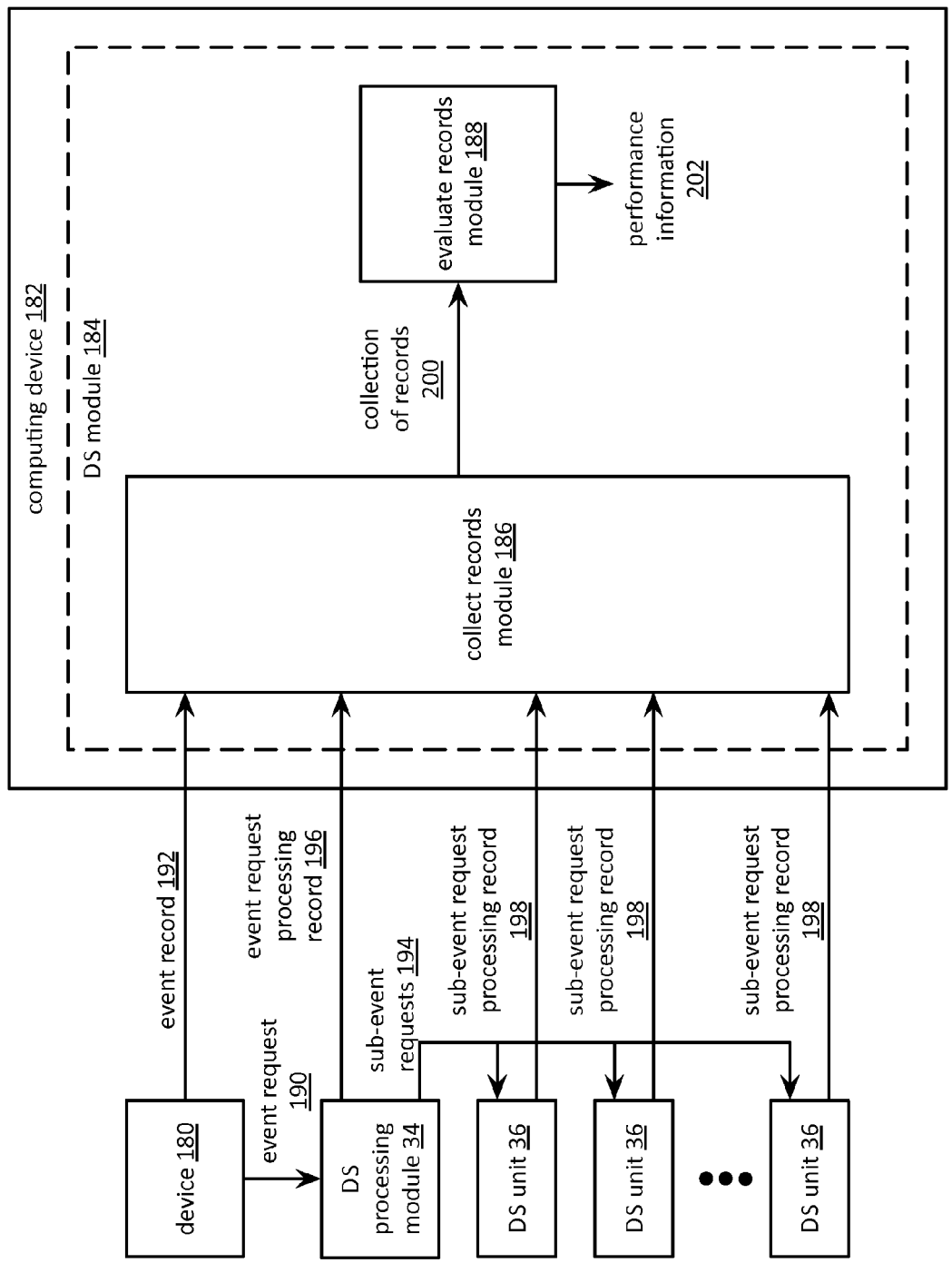
FIG. 9B is a schematic block diagram of another embodiment of a computing system in accordance with the present invention.

FIG. 9B is a schematic block diagram of another embodiment of a computing system that includes a device 180, a computing device 182, a dispersed storage (DS) processing module 34, and a plurality of DS units 36 of a dispersed storage network (DSN). The device 180 includes at least one of a user device 12, a user device 14, a DS processing unit 16, a storage integrity processing unit 20, a DS managing unit 18, and a management device affiliated with the DSN. The computing device 182 may be utilized to implement at least one of the DS managing unit 18 and the management device. The computing device 182 includes a dispersed storage module 184. The DS module 184 includes a collect records module 186 and an evaluate records module 188.

The device 180 initiates an event by sending an event request 190 to the DS processing module 34. The event includes a user access operation or a system administration operation. The device 180 generates an event record 192 including information regarding the event. The event record 192 includes identity of the device 180, an event identifier (ID) associated with the event, information regarding initiation of the event, and information regarding completion of the event.

The DS processing module 34 processes the event request 190 to produce a plurality of sub-event requests 194. The DS processing module 34 generates a record 196 regarding processing of event request including information regarding the DS processing module 34 processing the event request 190. The record 196 regarding the processing of the event request 190 includes identity of the DS processing module 34, an event identifier (ID) associated with the processing of the event request 190, a parent event ID associated with the event, information regarding initiation of the processing of the event request 190, and information regarding completion of the processing of the event request 190.

The plurality of DS units 36 generates a plurality of records 198 regarding processing of the plurality of sub-event requests 194 including information regarding the plurality of DS units 36 of the DSN processing the plurality of sub-event requests 194. A record 198 of the plurality of records 198 regarding the processing of the plurality of sub-event requests 194 includes identity of one of the plurality of DS units 36, an event identifier (ID) associated with the processing of a corresponding one of the plurality of sub-event requests 194 by the one of the plurality of DS units 36, a parent event ID associated with the event request 190, information regarding initiation of the processing of the corresponding one of the plurality of sub-event requests 194, and information regarding completion of the processing of the corresponding one of the plurality of sub-event requests 194.

The collect records module 186 collects the event record 192, the record 196 regarding processing of the event request 190, and the plurality of records 198 regarding processing of the plurality of sub-event requests 194 to produce a collection of records 200. The collecting includes receiving a record in an unsolicited fashion, initiating a record query, and accessing the collection of records from a memory.

The evaluate records module 188 evaluates the collection of records 200 to produce performance information 202 regarding the DSN. The evaluate records module 188 functions to evaluate by at least one of a performance response time of the DS processing module 34 and of one or more of the plurality of DS units 36, performance reliability of the DS processing module 34 and of the one or more of the plurality of DS units 36, and accessibility of the DS processing module 34 and of one or more of the plurality of DS units 36.

The collect records module 186 further functions to collect a plurality of event records 192 regarding a plurality of events, a plurality of records 196 regarding processing of a plurality of event requests 190, and a plurality of sets of records 198 regarding processing of sets of sub-event requests 194, wherein a set of the sets of records is regarding the processing of a set of sub-event requests 194 of one of the plurality of event requests 190. The collect records module 186 further functions to aggregate the plurality of event records 192, the plurality of records 196 regarding processing of the plurality of event requests 190, and the plurality of sets of records 198 regarding processing the sets of sub-event requests 194 to produce a plurality of collection of records.

Figure 9C:
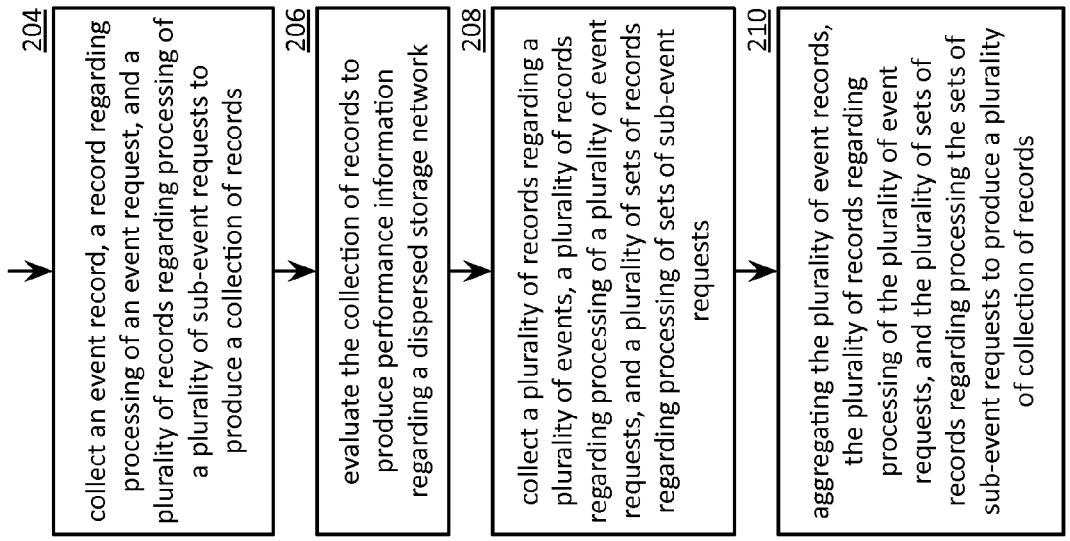
FIG. 9C is a flowchart illustrating an example of collecting event records in accordance with the present invention.

FIG. 9C is a flowchart illustrating an example of collecting event records. The method begins at step 204 where a processing module (e.g., of a management device affiliated with a dispersed storage network (DSN)) collects an event record, a record regarding processing of an event request, and a plurality of records regarding processing of a plurality of sub-event requests to produce a collection of records. The event record includes information regarding an event, wherein the event is a user access operation or a system administrative operation initiated by a device affiliated with the DSN. The record regarding processing of the event request includes information regarding a dispersed storage (DS) processing module of the DSN processing the event request to produce the plurality of sub-event requests. The plurality of records regarding processing of the plurality of sub-event requests includes information regarding a plurality of DS units of the DSN processing the plurality of sub-event requests.

The method continues at step 206 where the processing module evaluates the collection of records to produce performance information regarding the DSN. The evaluating includes at least one of a performance response time of the DS processing unit and of one or more of the plurality of DS units, performance reliability of the DS processing unit and of the one or more of the plurality of DS units, and accessibility of the DS processing unit and of one or more of the plurality of DS units.

The method continues at step 208 where the processing module collects a plurality of event records regarding a plurality of events, a plurality of records regarding processing of a plurality of event requests, and a plurality of sets of records regarding processing of sets of sub-event requests, wherein a set of the sets of records is regarding the processing of a set of sub-event requests of one of the plurality of event requests. The method continues at step 210 where the processing module aggregates the plurality of event records, the plurality of records regarding processing of the plurality of event requests, and the plurality of sets of records regarding processing the sets of sub-event requests to produce a plurality of collection of records.

FIG. 10A is a flowchart illustrating an example of generating a log record. The method begins with step 212 where a processing module (e.g., of a reporting entity processing module) detects a state change. The detection may be based on one or more of a software flag, a message, a predetermination, a process output, a pattern match, a valid state table, and a previous state condition. The method continues at step 214 where the processing module obtains a state descriptor. The obtaining may be based on one or more of the state change, lookup, generating a state descriptor, a state descriptor table lookup, retrieving the state descriptor, and receiving the state descriptor in response to sending a query. The method continues at step 216 where the processing module obtains a timestamp. The obtaining includes at least one of querying a time module, receiving the timestamp, and retrieving the timestamp.

The method continues at step 218 where the processing module obtains state parameters. The obtaining may be based on one or more of the state change, the state descriptor, the timestamp, a state parameters table lookup, retrieving state parameters, an error message, a parameter table lookup, a parameter history record lookup, and receiving a state parameter in response to sending a query. The method continues at step 220 where the processing module generates a log record entry. The generation includes aggregating the state change, the state descriptor, the timestamp, and the state parameters to produce entries for fields of the log record entry. The method continues at step 222 where the processing module facilitates storing the log record entry. The facilitation includes at least one of storing the log record entry locally and sending the log record entry to another system element (e.g., a dispersed storage (DS) managing unit) for storage.

FIG. 10B is a flowchart illustrating an example of generating a statistics record, that includes similar steps to FIG. 10A. The method begins at step 224 where a processing module (e.g., of a reporting entity processing module) determines to create a statistics record entry. The determination may be based on one or more of an error message, a state change, a time period, an event, a software flag, a message, a predetermination, a process output, a pattern match, a previous state condition, a previous statistic, a statistical correlation output, and a request. For example, the processing module determines to create the statistics record entry when a slice storage error message is received.

The method continues at step 226 where the processing module obtains one or more quantitative descriptor types. The obtaining may be based on one or more of a lookup, a system condition, configuration information, a retrieval, a query, receiving, an error message, and a memory utilization indicator. For example, the processing module obtains one or more quantitative descriptor types from a table lookup based on the slice storage error message, wherein the one or more quantitative descriptor types include available memory and memory device status.

The method continues at step 228 where the processing module obtains a quantitative descriptor value for each of the one or more quantitative descriptor types. The obtaining may be based on one or more of a query, receiving, an error message, a historical record lookup, another statistics record entry, and a value source indicator table lookup. For example, the processing module queries memory devices of a dispersed storage (DS) unit and receives memory device status and available memory information. The method continues with step 216 of FIG. 10A where the processing module obtains a timestamp. The method continues at step 232 where the processing module generates a statistics record entry. The generation includes generating one or more entries of fields of the statistics record entry including a reporting entity identifier (ID), a step of a process and/or event, the timestamp, the one or more quantitative descriptor types, and one or more quantitative descriptor values corresponding to each of the one more quantitative descriptor types. The method continues at 234 where the processing module facilitates storing the statistics record entry (e.g., storing locally or sending the statistics record entry).

FIG. 10C is a flowchart illustrating an example of correlating a statistics record and a log record. The method begins at step 236 where a processing module (e.g., of a reporting entity, a dispersed storage (DS) managing unit) determines whether to create an error report. The determination may be based on one or more of a report time period expiration, an error message, a request, a predetermination, a software trigger, a state transition detection, and a quantified descriptor value compares unfavorably to a descriptor threshold. For example, the processing module determines to create the error report when a report time period has expired since generation of a previous error report and a store slice error message has been received. The method continues to step 238 when the processing module determines to create the error report. The method continues at step 238 where the processing module correlates one or more statistics record entries with one or more log record entries to produce the error report. The correlation may be based on one or more of similar timestamps, similar reporting identifiers (IDs), similar event IDs, records with similar parent IDs, and records associated with a similar level of a hierarchical representation of an event sequence.

Figure 11:
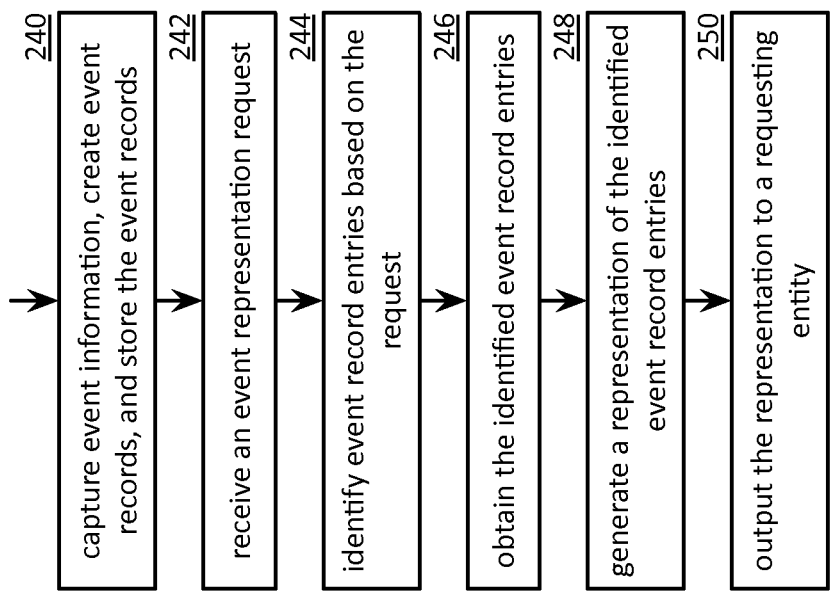
FIG. 11 is a flowchart illustrating an example of generating a representation of event records in accordance with the present invention.

FIG. 11 is a flowchart illustrating an example of generating a representation of event records. The method begins at step 240 where a processing module (e.g., of a dispersed storage (DS) managing unit) captures event information, creates event records, and stores the event records as previously described. The method continues at step 242 where the processing module receives an event representation request (e.g., from a user device, from another DS managing unit, from an error correlation process). The representation request includes one or more query filters, wherein a query filter of the query filters includes one or more of a request type, a level indicator, a reporting entity identifier (ID), an event ID, a parent event ID, and a child event ID.

The method continues at step 244 where the processing module identifies event record entries based on the representation request. The identification includes searching event record entries by comparing a query filter to an event record entry to identify favorable comparisons. The method continues at step 246 where the processing module obtains the identified event record entries. The obtaining includes retrieving the identified event record entries from one or more reporting entities storing event records. For example, the processing module determines to obtain the identified event record entries from a set of DS units and sends an event record entry retrieval request to each DS unit of a set of DS units. Next, the processing module receives retrieval responses from each DS unit of a set of DS units that includes the identified event record entries. The method continues at step 248 where the processing module generates a representation of the identified event record entries. The generation includes at least one of sorting by time, sorting by event ID, sorting by parent/child relationship, sorting by event level, displaying in a hierarchical view of parent events and child events (e.g., as described with reference to FIG. 8). The method continues at step 250 where the processing module outputs a representation to a requesting entity.

Figure 12:
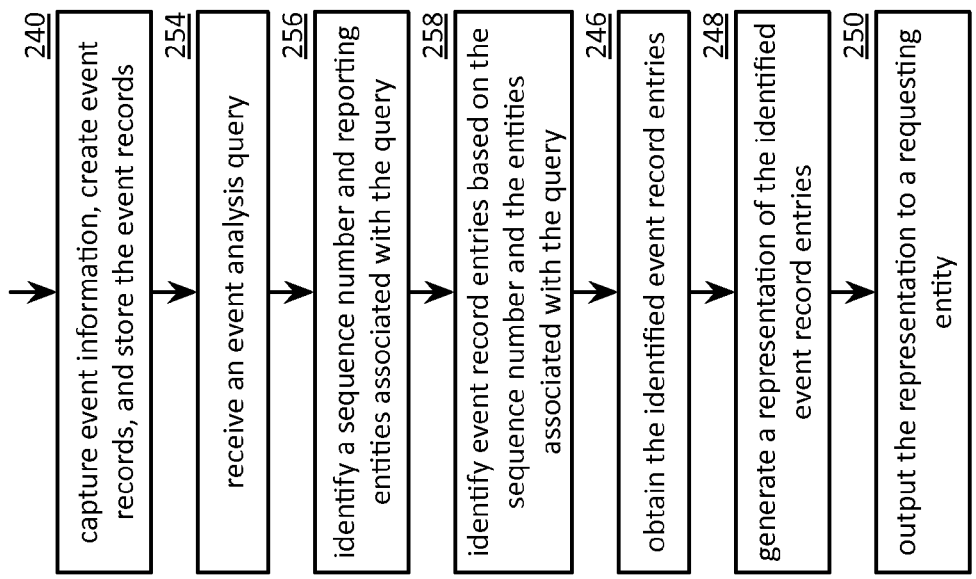
FIG. 12 is a flowchart illustrating an example of analyzing event records in accordance with the present invention.

FIG. 12 is a flowchart illustrating an example of analyzing event records, which include similar steps to FIG. 11. The method begins with step 240 of FIG. 11 where a processing module (e.g., of a dispersed storage (DS) managing unit) captures event information, creates event records, and stores the event records. The method continues at step 254 where the processing module receives an event analysis query (e.g., from a user device, from another DS managing unit, from an error correlation process). The event analysis query includes one or more event query filters, wherein an event query filter of the event query filters includes one or more of a request type, a requester identifier (ID), a level indicator, a reporting entity identifier (ID), an event ID, a parent event ID, and a child event ID.

The method continues at step 256 where the processing module identifies a sequence number and reporting entities associated with the query. The identification includes at least one of identifying a common sequence number of two or more event record entries associated with the query, identifying a requester ID from the two or more event record entries, and identifying a receiver ID from the two or more event record entries. For example, the processing module identifies a sequence number associated with a read request event and a read response event of the query. As another example, the processing module identifies these units 1-5 as reporting entities associated with the query.

The method continues at step 258 where the processing module identifies event record entries based on the sequence number and the entities associated with the query. The identification may be based on one or more of event record entries associated with the sequence number (e.g., an event record entry contains the sequence number) and event record entries associated with the entities associated with the query. The method continues with steps 246-250 of FIG. 11 where the processing module obtains the identified event record entries, generates a representation of the identified event record entries, and outputs the representation to a requesting entity.

Figure 13:
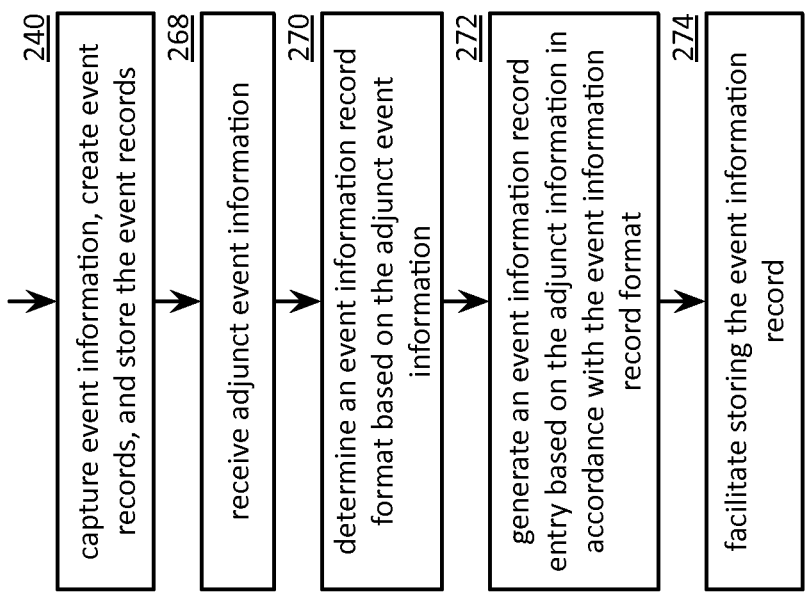
FIG. 13 is a flowchart illustrating an example of combining adjunct information with event records in accordance with the present invention.

FIG. 13 is a flowchart illustrating an example of combining adjunct information with event records, which include similar steps to FIG. 11. The method begins with step 240 of FIG. 11 where a processing module (e.g. of a reporting entity), captures event information, creates event records, and stores the event records. The method continues at step 268 where the processing module receives adjunct event information. The adjunct information includes at least one of a self-monitoring, analysis and reporting technology (SMART) log; a syslog; Java garbage collectors; a wrapper script; a test script; and a machine reboot indicator. The receiving includes at least one of receiving the adjunct event information from an external device in response to a query, monitoring the external device, and receiving a message.

The method continues at step 270 where the processing module determines an event information record format based on the adjunct event information. The event information record format includes at least one of an event record format, a log record format, and a statistics record format. The determination may be based on one or more of a format table lookup, a query, a message, and the adjunct information. The method continues at step 272 where the processing module generates an event information record entry based on the adjunct information in accordance with the event information record format. For example, the processing module generates a log record to include at least a portion of the adjunct event information when the event information record format is the log format. The method continues at step 274 where the processing module facilitates storing event information record (e.g., storing locally, sending).

Figure 14:
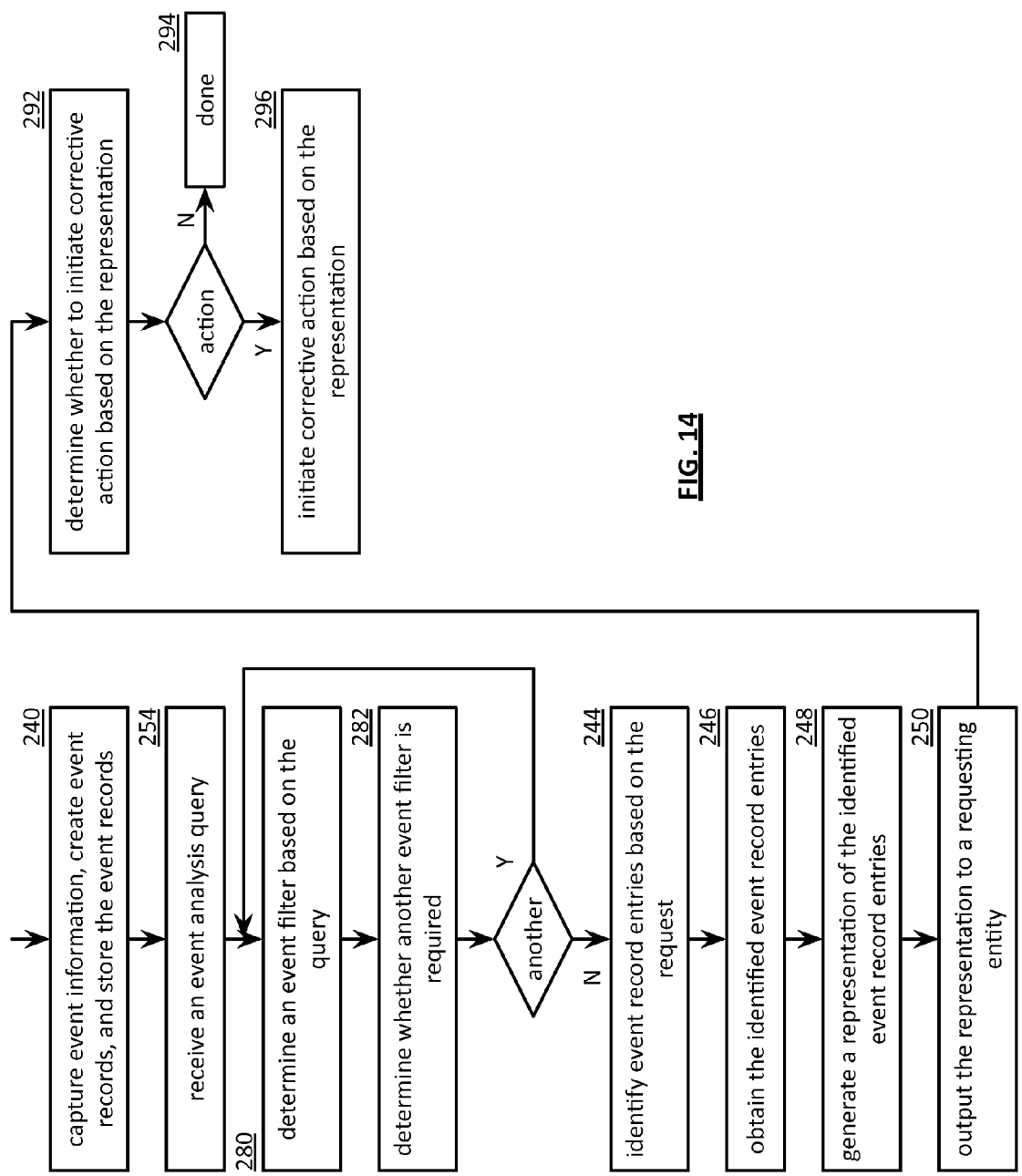
FIG. 14 is a flowchart illustrating another example of analyzing event records in accordance with the present invention.

FIG. 14 is a flowchart illustrating another example of analyzing event records, which include similar steps to FIGS. 11-12. The method begins with step 240 of FIG. 11 where a processing module (e.g. of a dispersed storage (DS) processing unit) captures event information, creates event records, and stores the event records. The method continues with step 254 of FIG. 12 where the processing module receives an event analysis query. The method continues at step 280 where the processing module determines an event filter based on the query. The determination may be based on at least one of a query type of the event analysis query and a query filter table lookup utilizing the query type is an index. Multiple event filters may be required to provide a favorable search.

The method continues at step 282 where the processing module determines whether another event filter is required. The determination may be based on one or more of a current member filters, an estimated number of required filters, a query filter table lookup to determine and estimated number of required filters, a message, and a search test result utilizing a current member of event filters. The method repeats back to step 280 when the processing module determines that another event filter is required. The method continues to step 244 of FIG. 11 when the processing module determines that another event filter is not required.

The method continues with steps 244-250 of FIG. 11 where the processing module identifies event record entries based on the request, obtains the identified event record entries, generates a representation of the identified event record entries, and outputs the representation to a requesting entity when the processing module determines that another event filter is not required. The method continues at step 292 where the processing module determines whether to initiate corrective action based on the representation. The determination may be based on one or more of a comparison of at least a portion of the representation to a representation threshold, a comparison of at least a portion of the representation to a previous representation identifying a trend, and determining that a comparison is unfavorable. For example, the processing module determines to initiate corrective action when the representation indicates that a decode threshold number of dispersed storage units are not available within a set of DS units utilize to store a plurality of sets of encoded data slices.

The method branches to step 296 when the processing module determines to initiate corrective action. The method ends at step 294 when the processing module determines to not initiate corrective action. The method continues at step 296 where the processing module initiates corrective action based on the representation. The corrective action includes at least one of rebuilding a slice, disabling a DS unit, enabling a hot standby DS unit, migrating a slice, sending an error message, and blocking a request. For example, the processing module initiates corrective action to include enabling the hot standby DS unit and migrating slices from a failing DS unit to the hot standby DS unit when the representation indicates that the failing DS unit has unacceptable performance.

Figure 15A:
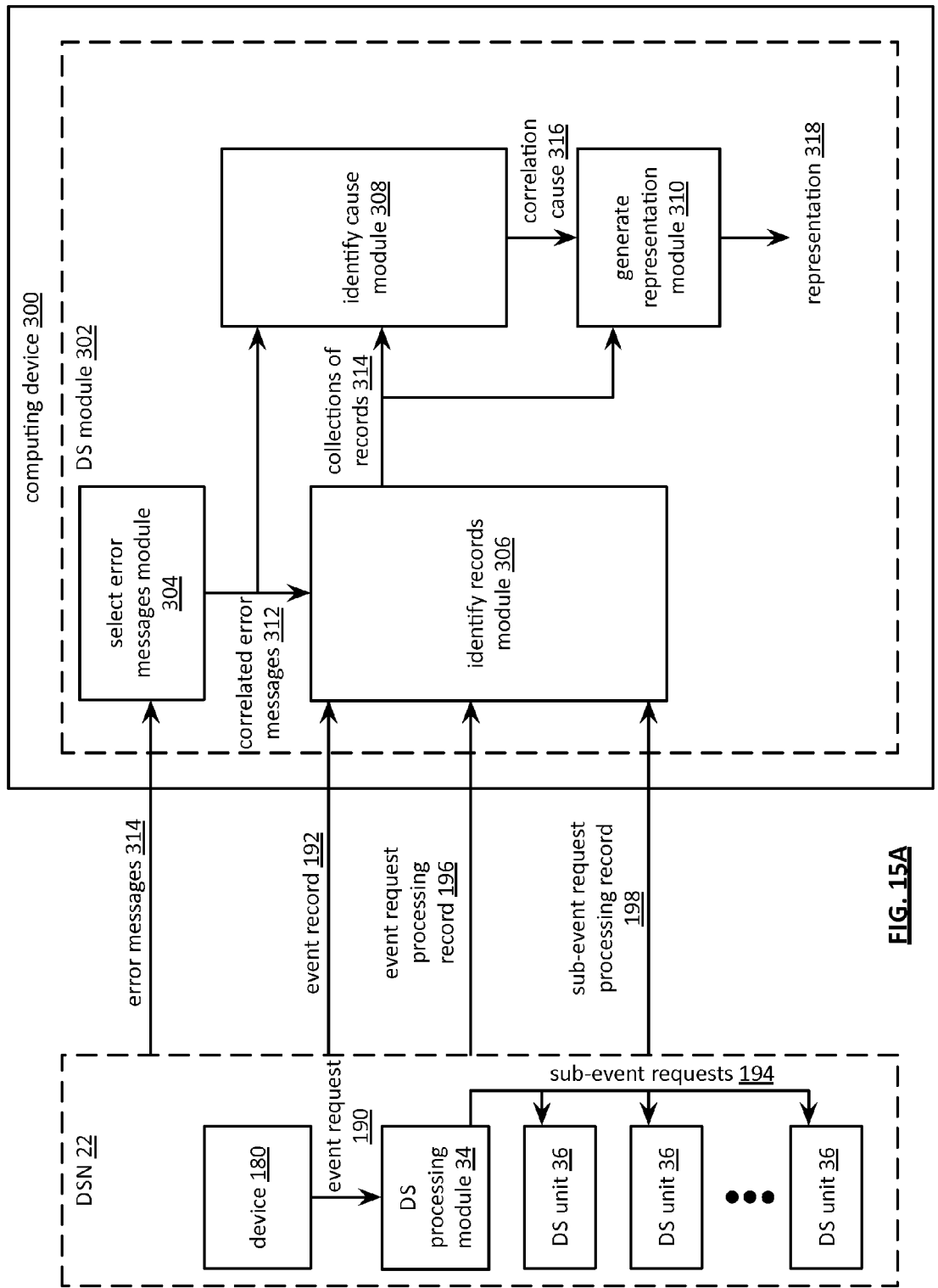
FIG. 15A is a schematic block diagram of another embodiment of a computing system in accordance with the present invention.

FIG. 15A is a schematic block diagram of another embodiment of a computing system that includes dispersed storage network (DSN) 22 and a computing device 300. The DSN 22 includes a device 180, a dispersed storage (DS) processing module 34, a plurality of DS units 36, and alternatively may include the computing device 300. The device 180 includes at least one of a user device 12, a user device 14, a DS processing unit 16, a storage integrity processing unit 20, a DS managing unit 18, and a management device affiliated with the DSN 22. The DS processing unit 34 may be implemented in one or more of the user device 12, the DS processing unit 16, and a DS unit 36. The computing device 300 may be utilized to implement at least one of the DS managing unit 18 and the management device. The computing device 300 includes a dispersed storage (DS) module 302. The DS module 302 includes a select error messages module 304, an identify records module 306, an identify cause module 308, and a generate representation module 310.

The select error messages module 304 selects two or more correlated error messages 312 of a plurality of error messages 314 from the DSN 22. An error message of the plurality of error messages 314 includes at least one of an object identifier (ID), a data ID, a reporting entity ID, a timestamp, an error type indicator, and an event ID. The selecting includes receiving the plurality of error messages 314. Receiving the error message includes at least one of receiving an unsolicited error message, receiving the error message in response to a query, and retrieving the error message from an error message list. The select error messages module 304 selects the two or more correlated error messages 312 by selecting a first one of the two or more correlated error messages based on an error selection scheme (e.g., a random error message, for a selected reporting entity, for a selected timeframe, for an error type, for a DSN address).

The select error messages module 304 identifies remaining ones of the two or more correlated error messages in a variety of ways. In a first identification method, the select error messages module 304 identifies the remaining ones of the two or more correlated error messages that includes an error type in common with the first one of the two or more error messages (e.g., errors of same type like a corrupted slice message). In a second identification method, the select error messages module 304 identifies the remaining ones of the two or more correlated error messages that includes a reporting entity in common with the first one of the two or more correlated error messages (e.g., errors from same source). In a third identification method, the select error messages module 304 identifies the remaining ones of the two or more correlated error messages that includes a timestamp value correlating with a timestamp of the first one of the two or more correlated error messages (e.g., errors occurred at about the same time). In a fourth identification method, the select error messages module 304 identifies the remaining ones of the two or more correlated error messages that includes an operation type in common with the first one of the two or more correlated error messages (e.g., errors when same operation performed such as retrieving). In a fifth identification method, the select error messages module 304 identifies the remaining ones of the two or more correlated error messages that includes DSN addressing information in common with the first one of the two or more correlated error messages (e.g., errors retrieving same slice).

The identify records module 306 identifies two or more collection of records 314 corresponding to the selected two or more correlated error messages 312. A collection of records of the two or more collection of records 314 includes a variety of records received from the DSN 22. The variety of records includes an event record 192 including information regarding an event, a first record 196 (e.g., an event request processing record) including information regarding the DS processing module 34 processing an event request 190 to produce a plurality of sub-event requests 194, and a plurality of records 198 including information regarding the plurality of DS units 36 processing the plurality of sub-event requests 194. The event is a user access operation or a system administrative operation initiated by the device 180 affiliated with the DSN 22. The event request 190 is regarding the event.

The identify records module 306 functions to identify a first of the two or more collection of records by identifying a first event corresponding to a first one of the two or more correlated error messages, determining a parent event identifier for the first event, and identifying a first one of the two or more collection of records based on the parent event identifier. The identifying the first event includes at least one of identifying a timestamp that compares favorably to a timestamp of the first one of the two or more correlated error messages and extracting a first event record ID from the first correlated error message. The event record includes identity of the device 180 that initiated the event, an event ID associated with the event, information regarding initiation of the event, and information regarding completion of the event.

The first record includes identity of the DS processing module 34, an event identifier (ID) associated with the processing of the event request 190, a parent event ID associated with the event, information regarding initiation of the processing of the event request 190, and information regarding completion of the processing of the event request 190. One of the plurality of records 198 includes identity of one of the plurality of DS units 36, an event identifier (ID) associated with the processing of a corresponding one of the plurality of sub-event requests 194 by the one of the plurality of DS units 36, a parent event ID associated with the event request 190, information regarding initiation of the processing of the corresponding one of the plurality of sub-event requests 194, and information regarding completion of the processing of the corresponding one of the plurality of sub-event requests 194.

The identify cause module 308 identifies a correlation cause 316 of one or more errors corresponding to the two or more correlated error messages 312 based on the two or more collections of records 314. The identify cause module 308 functions to identify the correlation cause 316 by one or more of a variety of methods. In a first method, the identify cause module 308 identifies the correlation cause 316 as one of the plurality of DS units 36 failing to perform a function corresponding to the processing of one of the plurality of sub-event requests 194 (e.g., a missing step compared to each other, compared to a template for an event type). In a second method, the identify cause module 308 identifies the correlation cause 316 as the DS processing unit 36 failing to perform a function corresponding to the processing of the event request 194. In a third method, the identify cause module 308 identifies the correlation cause 316 as one of the plurality of DS units 36 performing an additional function in excess of the processing of the one of the plurality of sub-event requests 194 (e.g., extra compared to each other, compared to a template for an event type).

In a fourth method, the identify cause module 308 identifies the correlation cause 316 as the DS processing unit 36 performing an additional function in excess of the processing of the event request 194. In a fifth method, the identify cause module 308 identifies the correlation cause 316 as one of the plurality of DS units 36 or the DS processing module 34 performing a function of the respective processing out of order of an expected function processing sequence (e.g., out of order compared to each other, compared to a template for an event type). In a sixth method, the identify cause module 308 identifies the correlation cause 316 as one of the plurality of DS units 36 failing to perform the function corresponding to the processing of one of the plurality of sub-event requests 194 within an expected time frame (e.g., late compared to each other, late compared to a template for an event type, early). The generate representation module 310 generates a graphical representation of at least one of the two or more collection of records 314 to illustrate the correlation cause 316. For example, the generate representation module 314 generates a graphical representation as illustrated in FIG. 8.

Figure 15B:
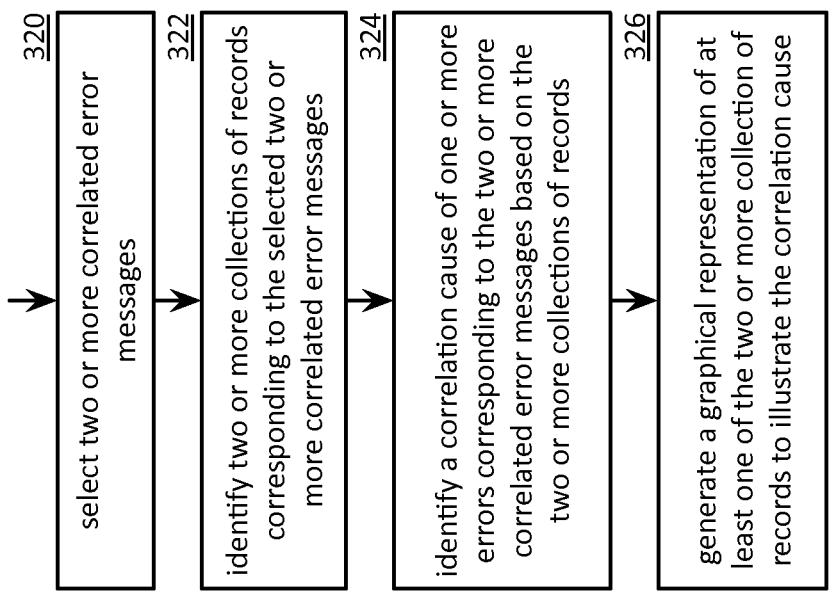
FIG. 15B is a flowchart illustrating an example of determining a cause of an error in accordance with the present invention.

FIG. 15B is a flowchart illustrating an example of determining a cause of an error within a dispersed storage network (DSN). The method begins at step 320 where a processing module (e.g., of a dispersed storage (DS) managing unit) selects two or more correlated error messages of a plurality of error messages. The selecting the two or more correlated error messages includes selecting a first one of the two or more correlated error messages based on an error selection scheme (e.g., by reporting entity, by error type, by timestamp, randomly, by a pareto chart, etc.) and identifying the remaining ones of the two or more correlated error messages by one or more of a variety of methods. A first method includes identifying remaining ones of the two or more correlated error messages that includes an error type in common with the first one of the two or more error messages (e.g., errors of same type such as a corrupted slice message). A second method includes identifying remaining ones of the two or more correlated error messages that includes a reporting entity in common with the first one of the two or more correlated error messages (e.g., errors from a common reporting entity).

A third method includes identifying remaining ones of the two or more correlated error messages that includes a timestamp value correlating with a timestamp of the first one of the two or more correlated error messages (e.g., errors occurring within a time window of each other). A fourth method includes identifying remaining ones of the two or more correlated error messages that includes an operation type in common with the first one of the two or more correlated error messages (e.g., errors when a common operation performed such as storing a slice of a common slice name). A fifth method includes identifying remaining ones of the two or more correlated error messages that includes DSN addressing information in common with the first one of the two or more correlated error messages (e.g., errors retrieving a common slice with a common slice name).

The method continues at step 322 or a processing module identifies two or more collection of records corresponding to the selected two or more correlated error messages. A collection of records of the two or more collection of records includes an event record, a first record, and a plurality of records including information regarding a plurality of DS units processing the plurality of sub-event requests. The event record includes information regarding an event. The event includes a user access operation or a system administrative operation initiated by a device affiliated with the DSN. The event record further includes identity of a device that initiated the event, an event identifier (ID) associated with the event, information regarding initiation of the event, and information regarding completion of the event. The first record includes information regarding a DS processing module processing an event request to produce a plurality of sub-event requests, wherein the event request is regarding the event.

The first record further includes identity of the DS processing module, an event ID associated with the processing of the event request, a parent event ID associated with the event, information regarding initiation of the processing of the event request, and information regarding completion of the processing of the event request. One of the plurality of records includes identity of one of the plurality of DS units, an event identifier (ID) associated with the processing of a corresponding one of the plurality of sub-event requests by the one of the plurality of DS units, a parent event ID associated with the event request, information regarding initiation of the processing of the corresponding one of the plurality of sub-event requests, and information regarding completion of the processing of the corresponding one of the plurality of sub-event requests.

The identifying the one of the two or more collection of records includes a sequence of steps. In a first step, the processing module identifies a first event corresponding to a first one of the two or more correlated error messages (e.g., timestamps fall within a common time frame, an identifier of the first event matches an event identifier of the first correlated error message). In a second step, the processing module determines a parent event identifier for the first event (e.g., via extracting the parent event identifier from a first record of the first event). In a third step, the processing module identifiers a first one of the two or more collection of records based on the parent event identifier (e.g., event records sharing the parent identifier, event records whose parents share the parent identifier, etc.).

The method continues at step 324 where the processing module identifies a correlation cause of one or more errors corresponding to the two or more correlated error messages based on the two or more collections of records. The identifying the correlation cause includes at least one of a variety of ways. In a first way, the processing module identifies the correlation cause as one of the plurality of DS units failing to perform a function corresponding to the processing of one of the plurality of sub-event requests. In a second way, the processing module identifies the correlation cause as the DS processing unit failing to perform a function corresponding to the processing of the event request. In a third way, the processing module identifies the correlation cause as one of the plurality of DS units performing an additional function in excess of the processing of the one of the plurality of sub-event requests.

In a fourth way, the processing module identifies the correlation cause as the DS processing unit performing an additional function in excess of the processing of the event request. In a fifth way, the processing module identifies the correlation cause as one of the plurality of DS units or the DS processing unit performing a function of the respective processing out of order of an expected function processing sequence. In a sixth way, the processing module identifies the correlation cause as one of the plurality of DS units failing to perform the function corresponding to the processing of one of the plurality of sub-event requests within an expected time frame. The method continues at step 326 where the processing module generates a graphical representation of at least one of the two or more collection of records to illustrate the correlation cause.

Figure 16A:
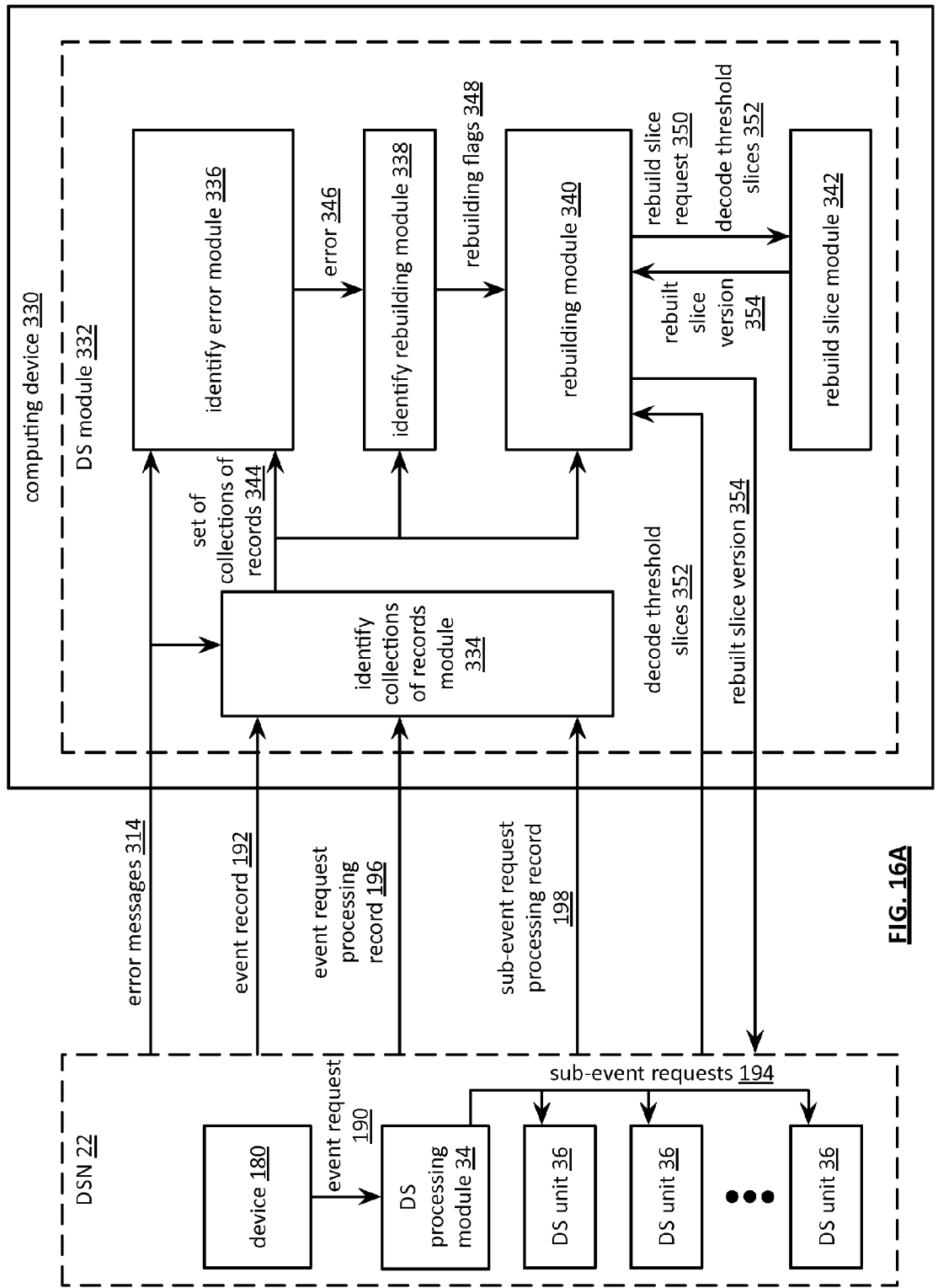
FIG. 16A is a schematic block diagram of another embodiment of a computing system in accordance with the present invention.

FIG. 16A is a schematic block diagram of another embodiment of a computing system that includes a dispersed storage network (DSN) 22 and a computing device 330. The DSN 22 includes a device 180, a dispersed storage (DS) processing module 34, a plurality of DS units 36, and alternatively may include the computing device 330. The device 180 includes at least one of a user device 12, a user device 14, a DS processing unit 16, a storage integrity processing unit 20, a DS managing unit 18, and a management device affiliated with the DSN 22. The DS processing unit 34 may be implemented in one or more of the user device 12, the DS processing unit 16, and a DS unit 36. The computing device 330 may be utilized to implement at least one of the DS managing unit 18 and the management device. The computing device 330 includes a dispersed storage module 332. The DS module 332 includes an identify collections of records module 334, an identify error module 336, an identify rebuilding module 338, a rebuilding module 340, and a rebuild slice module 342.

The identify collections of records module 334 identifies a set of collections of records 344 corresponding to a data segment that is stored in the DSN 22 as a set of encoded data slices. A collection of records of the set of collections of records 344 includes a variety of records received from the DSN 22. The variety of records includes an event record 192 including information regarding an event, a first record 196 (e.g., an event request processing record) including information regarding the DS processing module 34 processing an event request 190 to produce a plurality of sub-event requests 194, and a plurality of records 198 including information regarding the plurality of DS units 36 processing the plurality of sub-event requests 194. The event is a user access operation or a system administrative operation initiated by the device 180 affiliated with the DSN 22. The event request 190 is regarding the event.

The first record includes identity of the DS processing module 34, an event identifier (ID) associated with the processing of the event request 190, a parent event ID associated with the event, information regarding initiation of the processing of the event request 190, and information regarding completion of the processing of the event request 190. One of the plurality of records 198 includes identity of one of the plurality of DS units 36, an event identifier (ID) associated with the processing of a corresponding one of the plurality of sub-event requests 194 by the one of the set of DS units 36, a parent event ID associated with the event request 190, information regarding initiation of the processing of the corresponding one of the plurality of sub-event requests 194, and information regarding completion of the processing of the corresponding one of the plurality of sub-event requests 194.

The identify collections of records module 334 further functions to identify the set of collections of records by selecting the data segment based on one or more of an error message 314 regarding the one of the set of encoded data slices (e.g., a corrupted slice error message), an error of another data segment of a data object in common with the data segment, a data segment analysis list (e.g., a next segment for analysis) a random selection process, and a request to analyze the data segment (e.g., a request from a DS managing unit 18). The identify collections of records module 334 functions to identify the set of collections of records 344 by a series of steps. A first step includes identifying events associated with the data segment. For one of the events, a second step includes identifying the one of the events corresponding to a user access operation regarding the data segment (e.g., any writes to or reads associated with the data segment). A third step includes determining a parent event identifier for the first event (e.g., via a records lookup). A fourth step includes identifying one of the set of the collections of records based on the parent event identifier (e.g., all levels of records that connect to a highest level of the parent event identifier).

The identify error module 336 determines whether an error 346 exists for one of the set of encoded data slices based on at least some of the set of collections of records. The identify error module 336 functions to determine whether the error 346 exists by at least one of several methods. A first method includes identifying a record of the set of collections of records 344 in which one of the set of DS units 36 failed to perform an expected function (e.g., missing a step such as no write acknowledgment or no commit acknowledgment). A second method includes identifying another record of the set of collections of records 344 in which the DS processing module 34 failed to perform another expected function (e.g., not sending a sub-event request to a DS unit 36). A third method includes identifying a group of records of the set of collections of records 344 from which an out-of-order processing of a set of expected functions is detected (e.g., sending a commit acknowledgment before a write acknowledgment). A fourth method includes identifying yet another record of the set of collections of records 344 in which the one of the set of DS units 36 failed to perform the expected function within an expected time frame (e.g., sending a commit acknowledgment minutes after receiving a commit request, sending a retrieved slice minutes after receiving a retrieved slice request). A fifth method includes identifying an error message of the plurality of error messages 314 and/or an error message pattern that compares favorably to a retrieved error message pattern of the error 346.

The identify rebuilding module 338, when the error 346 exists, flags the one of the set of encoded data slices for potential rebuilding 348. The flagging includes at least one of generating a list of slices for potential rebuilding, modifying the set of collections of records 344 to indicate slice names corresponding to the one of the set of encoded data slices for potential rebuilding, and outputting the list of slices for potential rebuilding to the storage integrity processing module 20.

The rebuilding module 340 determines that errors 346 exist for two or more encoded data slices of the set of encoded data slices based on the at least some of the set of collections of records 344. The rebuilding module 340 determines whether to rebuild each of the two or more encoded data slices (e.g., based on one or more of a system capacity indicator, a reliability level indicator, a reliability level goal, a predetermination, a request). When a determination is made to rebuild one of the two or more encoded data slices, the rebuilding module 340 initiates rebuilding of the one of the two or more encoded data slices and unflags remaining ones of the two or more of encoded data slices for potential rebuilding. The initiating includes at least one of generating a rebuild slice request 350 that includes a slice name of the one of the two or more encoded data slices, outputting the rebuild slice request 350 to at least one of the storage integrity processing unit 20 and the rebuild slice module 342, and directly rebuilding the one of the two or more encoded data slices to produce a rebuilt slice version 354 for storage in the DSN 22.

The rebuild slice module 342 rebuilds the one of the set of encoded data slices by a series of steps. In a first step the rebuild slice module 342 generates a decoding coded matrix of coded values of at least a decode threshold number of encoded data slices 352 of the set of encoded data slices in accordance with a dispersed storage error coding function. For example, the rebuild slice module 342 generates the decoding coded matrix to include a column of the coded values of the at least the decode threshold number of encoded data slices 352. In a second step the rebuild slice module 342 generates a data matrix from the decoding coded matrix and a decoding matrix in accordance with the dispersed storage error coding function, wherein the data matrix represents a rebuilding of the data segment. The decoding matrix is generated from a corresponding encoding matrix by eliminating rows of the encoding matrix for all rows except rows corresponding to the rows of the decoding coded matrix to produce a reduced encoding matrix and inverting the reduced encoding matrix to produce the decoding matrix. The rebuild slice module 342 generates the data matrix by matrix multiplying the decoding coded matrix by the decoding matrix.

In a third step the rebuild slice module 342 generates a rebuilt coded matrix from the data matrix and the encoding matrix. For example, the rebuild slice module 342 matrix multiplies the data matrix by the encoding matrix to produce the rebuilt coded matrix. In a fourth step the rebuild slice module 342 generates the rebuilt slice version 354 of the one of the set of encoded data slices from the rebuilt coded matrix for storage in the DSN 22. For example, the rebuild slice module 342 extracts the rebuilt slice version 354 from the rebuilt coded matrix.

Figure 16B:
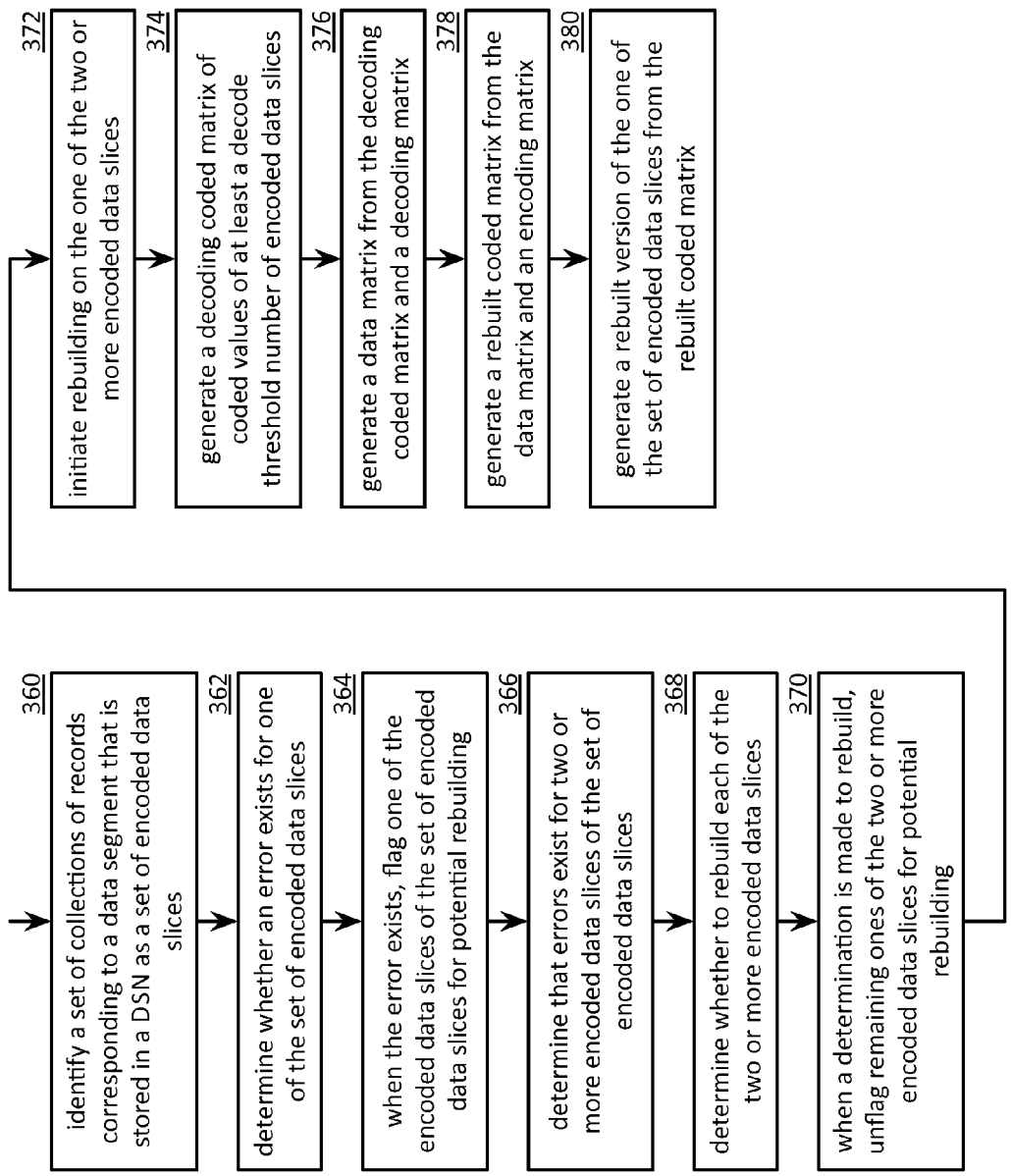
FIG. 16B is a flowchart illustrating an example of identifying a slice to rebuild in accordance with the present invention.

FIG. 16B is a flowchart illustrating an example of identifying a slice to rebuild.

The method begins at step 360 where a processing module (e.g., a dispersed storage (DS) processing module of a DS managing unit) identifies a set of collections of records corresponding to a data segment that is stored in a dispersed storage network (DSN) as a set of encoded data slices. A collection of records of the set of collections of records includes an event record including information regarding an event, a first record including information regarding a DS processing module processing an event request to produce a plurality of sub-event requests, and a plurality of records including information regarding a set of DS units processing the plurality of sub-event requests. The event is a user access operation or a system administrative operation initiated by a device affiliated with the DSN. The event request is regarding the event.

The first record includes identity of the DS processing module, an event identifier (ID) associated with the processing of the event request, a parent event ID associated with the event, information regarding initiation of the processing of the event request, and information regarding completion of the processing of the event request. One of the plurality of records includes identity of one of the set of DS units, an event identifier (ID) associated with the processing of a corresponding one of the plurality of sub-event requests by the one of the set of DS units, a parent event ID associated with the event request, information regarding initiation of the processing of the corresponding one of the plurality of sub-event requests, and information regarding completion of the processing of the corresponding one of the plurality of sub-event requests.

The identifying the set of collections of records further includes selecting the data segment based on one or more of an error message regarding the one of the set of encoded data slices, an error of another data segment of a data object in common with the data segment, a data segment analysis list, a random selection process, and a request to analyze the data segment. The identifying the set of collections of records includes identifying events associated with the data segment and for one of the events at least one of a variety of steps. A first step includes identifying the one of the events corresponding to a user access operation regarding the data segment. A second step includes determining a parent event identifier for the first event. A third step includes identifying one of the set of the collections of records based on the parent event identifier.

The method continues at step 362 where the processing module determines whether an error exists for one of the set of encoded data slices based on at least some of the set of collections of records. The determining whether the error exists includes at least one of a variety of methods. In a first method, the processing module identifies a record of the set of collections of records in which one of the set of DS units failed to perform an expected function. In a second method, the processing module identifies another record of the set of collections of records in which the DS processing module failed to perform another expected function. In a third method, the processing module identifies a group of records of the set of collections of record from which an out-of-order processing of a set of expected functions is detected. In a fourth method, the processing module identifies yet another record of the set of collections of records in which the one of the set of DS units failed to perform the expected function within an expected time frame.

When the error exists, the method continues at step 364 where the processing module flags the one of the set of encoded data slices for potential rebuilding. The method continues at step 366 where the processing module determines that errors exist for two or more encoded data slices of the set of encoded data slices based on the at least some of the set of collections of records. The method continues at step 368 where the processing module determines whether to rebuild each of the two or more encoded data slices. When a determination is made to rebuild one of the two or more encoded data slices, the method continues at step 370 where the processing module unflags remaining ones of the two or more of encoded data slices for potential rebuilding.

The method continues at step 372 where the processing module initiates rebuilding of the one of the two or more encoded data slices. The method continues at step 374 where the processing module generates a decoding coded matrix of coded values of at least a decode threshold number of encoded data slices of the set of encoded data slices in accordance with a dispersed storage error coding function. The method continues at step 376 where the processing module generates a data matrix from the decoding coded matrix and a decoding matrix in accordance with the dispersed storage error coding function, wherein the data matrix represents a rebuilding of the data segment. The method continues at step 378 where the processing module generates a rebuilt coded matrix from the data matrix and an encoding matrix. The method continues at step 380 where the processing module generates a rebuilt version of the one of the set of encoded data slices from the rebuilt coded matrix.

Figure 17:
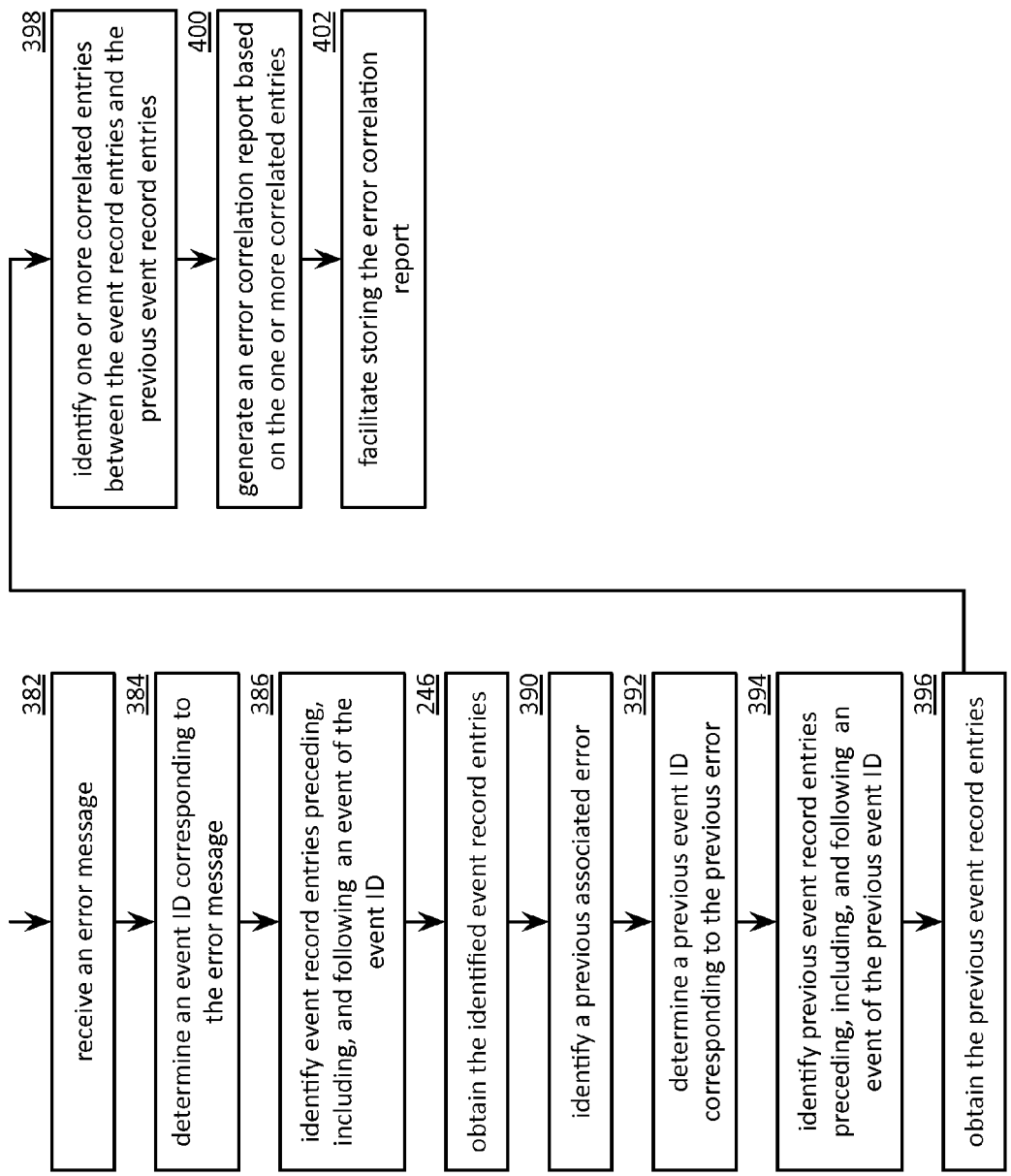
FIG. 17 is a flowchart illustrating an example of correlating errors in accordance with the present invention.

FIG. 17 is a flowchart illustrating an example of correlating errors, which include similar steps to FIG. 11. The method begins with step 382 where a processing module (e.g., of a dispersed storage (DS) managing unit) receives an error message. The method continues at step 384 where the processing module determines an event identifier (ID) corresponding to the error message. The method continues at step 386 where the processing module identifies event record entries preceding, including, and following an event of the event ID. The identifying may be based on at least one of a timestamp associated with event ID and event record entries associated with a timestamp within a predetermined time before and after the timestamp. For example, the processing module identifies event record entries that are time stamped within 60 minutes of the event ID when the predetermined time is 60 minutes. The method continues at step 246 of FIG. 11 where the processing module obtains the event record entries.

The method continues at step 390 where the processing module identifies a previous associated error. The identification maybe based on one or more of the error message and the identified event record entries. The previous associated error includes at least one of a previous error that is substantially same as an error of the error message and a previous error that is related to (e.g., same error family, same reporting entity IDs, typically present with the error) the error of the error message. The method continues at step 392 where the processing module determines a previous event ID corresponding to the previous error (e.g., a lookup). The method continues at step 394 where the processing module identifies previous event record entries preceding, including, and following an event of the previous event ID. The method continues at step 396 where the processing module obtains the previous event record entries.

The method continues at step 398 where the processing module identifies one or more correlated entries between the event record entries and the previous event record entries. The identifying includes comparing entries to identify a favorable correlation trend. For example, the processing module compares entries to identify an event that always precedes the error. The method continues at step 400 where the processing module generates an error correlation report based on the one or more correlated entries. The generation includes identifying and aggregating report elements including one or more of the error message, the one or more correlated entries, the event ID, the previous associated error, the previous event ID, and a timestamp. The method continues at step 402 where the processing module facilitates storing the error correlation report. The facilitation includes at least one of storing the error correlation report in a local memory and sending the error correlation report to another system entity (e.g., a requesting entity).

Figure 18A:
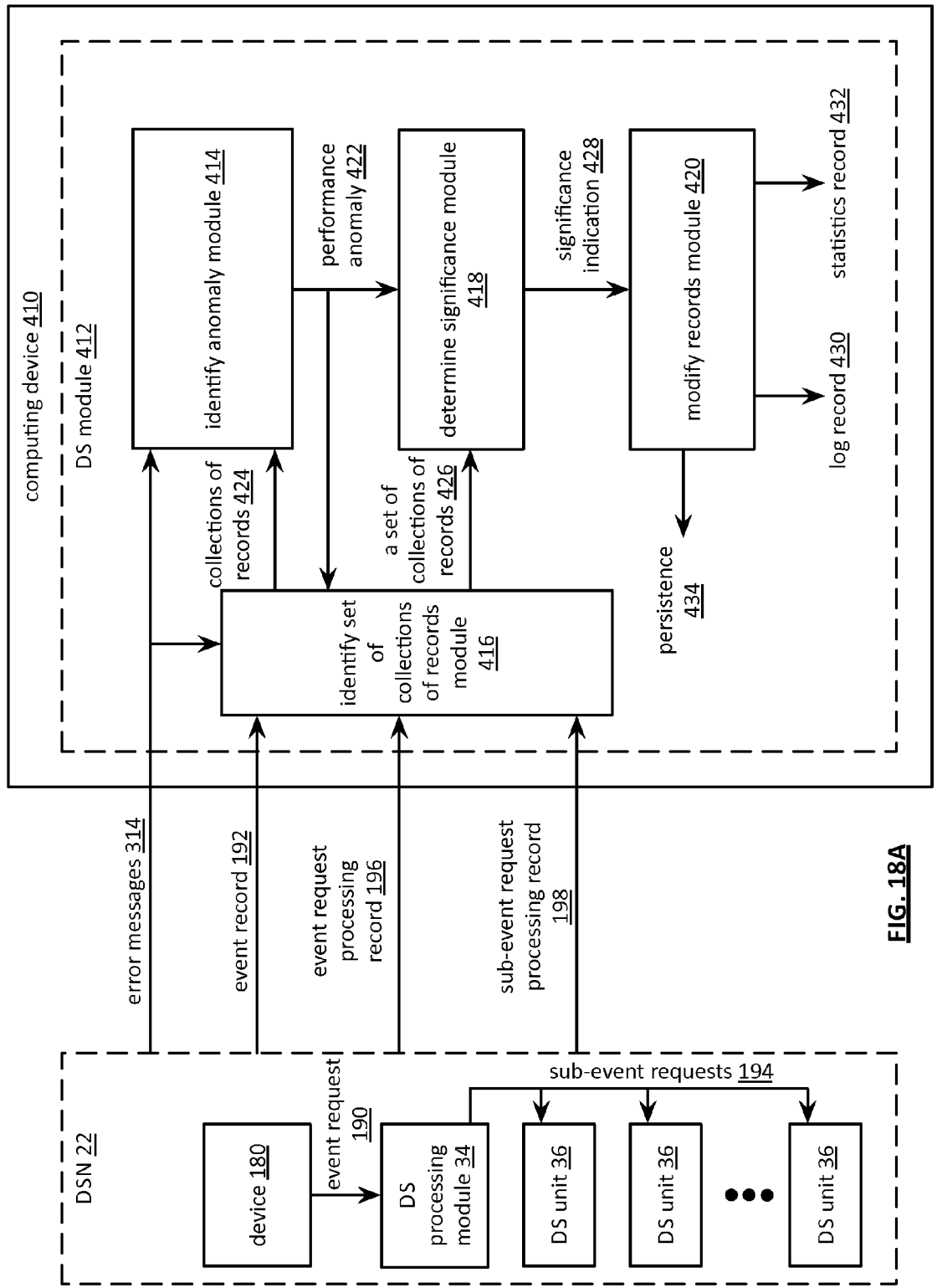
FIG. 18A is a schematic block diagram of another embodiment of a computing system in accordance with the present invention.

FIG. 18A is a schematic block diagram of another embodiment of a computing system that includes a dispersed storage network (DSN) 22 and a computing device 410. The DSN 22 includes a device 180, a dispersed storage (DS) processing module 34, a plurality of DS units 36, and alternatively may include the computing device 410. The device 180 includes at least one of a user device 12, a user device 14, a DS processing unit 16, a storage integrity processing unit 20, a DS managing unit 18, and a management device affiliated with the DSN 22. The DS processing unit 34 may be implemented in one or more of the user device 12, the DS processing unit 16, and a DS unit 36. The computing device 410 may be utilized to implement at least one of the DS managing unit 18 and the management device. The computing device 410 includes a dispersed storage module 412. The DS module 412 includes an identify anomaly module 414, an identify set of collections of records module 416, a determine significance module 418, and a modify records module 420.

The identify anomaly module 414 identifies a performance anomaly 422 within the DSN 22. The identifying includes receiving a plurality of error messages 314 from the DSN 22 and may include accessing collections of records 424. The performance anomaly 422 includes one or more of an encoded data slice error, a DS module 34 processing error, a deviation from expected performance of a DS unit 36 of the set of DS units 36, a deviation from expected performance of the DS processing module 34, a deviation from an expected ordering of performance of functions, a delay in performance of an expected function, and an error in performance of the expected function. The identify anomaly module 414 functions to identify the performance anomaly by a variety of approaches. In a first approach, the identify anomaly module 414 identifies a deviation of performance of one or more of the set of DS units 36 from an expected DS unit performance trend. For example, the identify anomaly module 414 receives a collection of records 424 that identifies a DS unit 36 that responds more slowly to an excess request sequence than other DS units 36 of the set of DS units 36. In a second approach, the identify anomaly module 414 identifies another deviation of the DS processing module 34 from an expected DS processing module performance trend.

The identify set of collections of records module 416 identifies a set of collections of records 424 corresponding to the performance anomaly 422. The identifying may include receiving the plurality of error messages 314 and receiving the performance anomaly 422. One of the set of collections of records includes an event record including information regarding an event, a first record including information regarding the DS processing module 34 processing an event request to produce a plurality of sub-event requests, and a plurality of records including information regarding the set of DS units 36 processing the plurality of sub-event requests. The event is a user access operation or a system administrative operation initiated by a device affiliated with the DSN 22. The event request is regarding the event.

The first record includes identity of the DS processing module 34, an event identifier (ID) associated with the processing of the event request, a parent event ID associated with the event, information regarding initiation of the processing of the event request, and information regarding completion of the processing of the event request. One of the plurality of records includes identity of one of the set of DS units 36, an event identifier (ID) associated with the processing of a corresponding one of the plurality of sub-event requests by the one of the set of DS units 36, a parent event ID associated with the event request, information regarding initiation of the processing of the corresponding one of the plurality of sub-event requests, and information regarding completion of the processing of the corresponding one of the plurality of sub-event requests.

The identify set of collections of records module 416 functions to identify the set of collections of records 426 by identifying events associated with the performance anomaly 422 (e.g., identifying event records of events that include a DSN address associated with the performance anomaly and/or identifying event records of events that correspond to a timeframe of the performance anomaly). For one of the events, the identify set of collections of records module 416 identifies the one of the events corresponding to a user access operation regarding the performance anomaly (e.g., any writes to or reads associated with the performance anomaly), determines a parent event identifier for the first event, and indentifies one of the set of the collections of records based on the parent event identifier. The identify set of collections of records module 416 may further function to provide the identify anomaly module 414 with collections of records 424 for analysis to identify the performance anomaly 422.

The determine significance module 418 determines whether a reliable significance indication 428 of the performance anomaly is determinable based on at least some of the set of collections of records 426. The determine significance module 418 functions to determine whether the reliable significance indication 428 of the performance anomaly 422 is determinable by at least one of a variety of approaches. In a first approach, the determine significance module 418 determines that the significance indication 428 is reliable when the performance anomaly 422 corresponds to a de-minimis performance degradation of the DSN 22. For example, the determine significance module 418 quantifies a performance degradation of the DSN 22 and determines that the performance degradation is less than a performance degradation threshold associated with the de-minimis performance degradation.

In a second approach, the determine significance module 418 determines that the significance indication 428 is reliable when the performance anomaly 422 corresponds to an undesired performance degradation of the DSN 22. For example, the determine significance module 418 quantifies another performance degradation of the DSN 22 and determines that the other performance degradation is greater than an undesired performance degradation threshold. In a third approach, the determine significance module 418 determines that the significance indication 428 is unreliable when the performance anomaly 422 corresponds to a performance degradation that is greater than the de-minimis performance degradation and is less than the undesired performance degradation.

When the reliable significance indication 428 of the performance anomaly 422 is not determinable, the modify records module 420 modifies data collection criteria for one or more of the sets collections of records. The modify records module 420 functions to modify data collection criteria for one or more of the sets collections of records by at least one of a variety of approaches. In a first approach, the modify records module 420 adds a log record 430 to one or more records of the set of collections of records 426. A log record 430 includes one or more of a reporting entity identifier, a state identifier associated with a state of processing, a timestamp corresponding to the state, a state descriptor corresponding to the state, and state parameters corresponding to the state. The adding includes directly generating the log record 430, sending a request to a reporting entity associated with the performance anomaly 422 to generate the log record 430, and sending a request to the reporting entity to generate another log record 430 for each additional record or modification of an existing record associated with the performance anomaly 422.

In a second approach, the modify records module 420 adds a statistics record 432 to the one or more records of the set of collections of records. The statistics record 432 includes one or more of a reporting entity identifier, a step identifier associated with a step of processing, a timestamp corresponding to the step, and one or more descriptors corresponding to the step. A descriptor of the one or more descriptors includes a type and a value. The adding includes directly generating the statistics record 432, sending a request to a reporting entity associated with the performance anomaly 422 to generate the statistics record 432, and sending a request to the reporting entity to generate another statistics record 432 for each additional record or modification of an existing record associated with the performance anomaly 422.

In a third approach, the modify records module 420 modifies persistence 434 of the one or more records of the set of collections of records. For example, the modify records module 420 increases persistence when the reliable significance indication 428 of the performance anomaly 422 is not determinable to extend a collection time period of more information. As another example, the modify records module 420 decreases persistence when the reliable significance indication 428 of the performance anomaly 422 is determinable to shorten the collection time period of more information. As yet another example, the modify records module 420 decreases persistence by deleting one or more records associated with the performance anomaly 422 when the reliable significance indication 428 of the performance anomaly 422 is determinable.

Figure 18B:
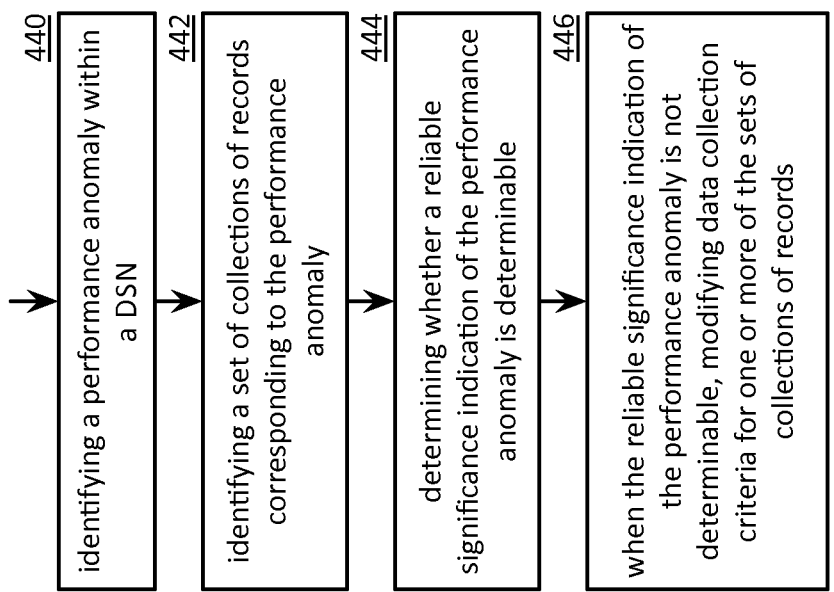
FIG. 18B is a flowchart illustrating an example of modifying event records in accordance with the present invention.

FIG. 18B is a flowchart illustrating an example of modifying event records in accordance with the present invention. The method begins at step 440 where a processing module (e.g., a dispersed storage (DS) processing module of a DS managing unit) identifies a performance anomaly within a dispersed storage network (DSN). The processing module identifiers the performance anomaly by at least one of identifying a deviation of performance of one or more of the set of DS units from an expected DS unit performance trend and identifying another deviation of the DS processing module from an expected DS processing module performance trend.

The method continues at step 442 where the processing module identifies a set of collections of records corresponding to the performance anomaly. One of the set of collections of records includes an event record including information regarding an event, a first record including information regarding a DS processing module processing an event request to produce a plurality of sub-event requests, and a plurality of records including information regarding a set of DS units processing the plurality of sub-event requests. The event includes a user access operation or a system administrative operation initiated by a device affiliated with the DSN. The event request includes a request regarding the event. The identifying the set of collections of records includes the processing module identifying events associated with the performance anomaly. The identifying the set of collections of records further includes, for one of the events, three steps. In a first step, the processing module identifies the one of the events corresponding to a user access operation regarding the performance anomaly. In a second step, the processing module determines a parent event identifier for the first event. In a third step, the processing module identifies one of the set of the collections of records based on the parent event identifier.

The method continues at step 444 where the processing module determines whether a reliable significance indication of the performance anomaly is determinable based on at least some of the set of collections of records. The determining whether a reliable significance indication of the performance anomaly is determinable includes at least one of a variety of methods. In a first method, the processing module determines that the significance indication is reliable when the performance anomaly corresponds to a de-minimis performance degradation of the DSN. In a second method, the processing module determines that the significance indication is reliable when the performance anomaly corresponds to an undesired performance degradation of the DSN. In a third method, the processing module determines that the significance indication is unreliable when the performance anomaly corresponds to a performance degradation that is greater than the de-minimis performance degradation and is less than the undesired performance degradation.

When the reliable significance indication of the performance anomaly is not determinable, the method continues at step 446 where the processing module modifies data collection criteria for one or more of the sets collections of records. The modifying data collection criteria for one or more of the sets collections of records include at least one of a variety of approaches. In a first approach, the processing module adds a log record to one or more records of the set of collections of records. The log record includes one or more of a reporting entity identifier, a state identifier associated with a state of processing, a timestamp corresponding to the state, a state descriptor corresponding to the state, and state parameters corresponding to the state. In a second approach, the processing module adds a statistics record to the one or more records of the set of collections of records. The statistics record includes one or more of a reporting entity identifier, a step identifier associated with a step of processing, a timestamp corresponding to the step, and one or more descriptors corresponding to the step. In a third approach, the processing module modifies persistence of the one or more records of the set of collections of records. For example, the processing module determines that a time duration to save records is 48 hours based on an error priority table lookup when the performance anomaly is associated with a low voltage detection associated with a DS unit. As another example, the processing module determines that the time duration to save records is 30 days based on an error priority table lookup when the performance anomaly is associated with a failing memory of a DS unit.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:
1. A method comprises:
identifying a performance anomaly within a dispersed storage network (DSN);
identifying a set of collections of records corresponding to the performance anomaly, wherein a collection of records of the set of collections of records includes:
an event record including information regarding an event, wherein the event is a user access operation or a system administrative operation initiated by a device affiliated with the DSN;
a first record including information regarding a dispersed storage (DS) processing module processing an event request to produce a plurality of sub-event requests, wherein the event request is regarding the event; and
a plurality of records including information regarding a set of DS units processing the plurality of sub-event requests wherein the identifying the set of collections of records includes:
identifying events associated with the performance anomaly; and
for one of the events:
identifying the one of the events corresponding to a user access operation regarding the performance anomaly;
determining a parent event identifier for the first event; and
identifying one of the collection of records of the set of the collections of records based on the parent event identifier;

determining, based on at least some of the collection of records of the set of collections of records, whether the performance anomaly is indicative of an undesired performance degradation of the DSN, a de-minimis performance degradation of the DSN, or an undeterminable performance degradation of the DSN; and when the performance anomaly is indicative of the undeterminable performance degradation of the DSN, modifying data collection criteria for one or more of the collection of records of the set of the collections of records such that a determination of the undesired performance degradation of the DSN or the de-minimis performance degradation of the DSN can be rendered regarding the performance anomaly or for subsequent performance anomalies.

2. The method of claim 1, wherein the performance anomaly comprises one or more of:
an encoded data slice error;
a DS module processing error;
a deviation from expected performance of a DS unit of the set of DS units;
a deviation from expected performance of the DS processing module;
a deviation from an expected ordering of performance of functions;
a delay in performance of an expected function; and
an error in performance of the expected function.

3. The method of claim 1, wherein the identifying the performance anomaly comprises at least one of:
identifying a deviation of performance of one or more of the set of DS units from an expected DS unit performance trend; and
identifying another deviation of the DS processing module from an expected DS processing module performance trend.

4. The method of claim 1, wherein the modifying data collection criteria for the one or more of the collection of records of the set of collections of records comprises at least one of:
adding a log record to one or more records of the collection of records of the set of collections of records, wherein a log record includes one or more of a reporting entity identifier, a state identifier associated with a state of processing, a timestamp corresponding to the state, a state descriptor corresponding to the state, and state parameters corresponding to the state;
adding a statistics record to the one or more records of the collection of records of the set of collections of records, wherein the statistics record includes one or more of a reporting entity identifier, a step identifier associated with a step of processing, a timestamp corresponding to the step, and one or more descriptors corresponding to the step; and
modifying persistence of the one or more records of the set of collections of records.

5. The method of claim 1, wherein the first record comprises:
identity of the DS processing module;
an event identifier (ID) associated with the processing of the event request;
a parent event ID associated with the event;
information regarding initiation of the processing of the event request; and
information regarding completion of the processing of the event request.

6. The method of claim 1, wherein one of the plurality of records comprises:
identity of one of the set of DS units;
an event identifier (ID) associated with the processing of a corresponding one of the plurality of sub-event requests by the one of the set of DS units;
a parent event ID associated with the event request;
information regarding initiation of the processing of the corresponding one of the plurality of sub-event requests; and
information regarding completion of the processing of the corresponding one of the plurality of sub-event requests.

7. A dispersed storage (DS) module comprises:
a first module, when operable within a computing device, causes the computing device to:
identify a performance anomaly within a dispersed storage network (DSN);
a second module, when operable within the computing device, causes the computing device to:
identify a set of collections of records corresponding to the performance anomaly,
wherein one of the set of collections of records includes:
an event record including information regarding an event, wherein the event is a user access operation or a system administrative operation initiated by a device affiliated with the DSN;
a first record including information regarding a dispersed storage (DS) processing module processing an event request to produce a plurality of sub-event requests,
wherein the event request is regarding the event; and
a plurality of records including information regarding a set of DS units processing the plurality of sub-event requests wherein the second module functions to identify the set of collections of records by:
identifying events associated with the performance anomaly; and
for one of the events:
identifying the one of the events corresponding to a user access operation regarding the performance anomaly;
determining a parent event identifier for the first event; and
identifying one of the collection of records of the set of the collections of records based on the parent event identifier;
a third module, when operable within the computing device, causes the computing device to:
determine, based on at least some of the collection of records of the set of collections of records, whether the performance anomaly is indicative of an undesired performance degradation of the DSN, a de-minimis performance degradation of the DSN, or an undeterminable performance degradation of the DSN; and
a fourth module, when operable within the computing device, causes the computing device to:
when the performance anomaly is indicative of the undeterminable performance degradation of the DSN, modify data collection criteria for one or more of the collection of records of the set of the collections of records such that a determination of the undesired performance degradation of the DSN or the de-minimis performance degradation of the DSN can be rendered regarding the performance anomaly or for subsequent performance anomalies.

8. The DS module of claim 7, wherein the performance anomaly comprises one or more of:
an encoded data slice error;
a DS module processing error;

a deviation from expected performance of a DS unit of the set of DS units;

a deviation from expected performance of the DS processing module;

a deviation from an expected ordering of performance of functions;

a delay in performance of an expected function; and an error in performance of the expected function.

9. The DS module of claim 7, wherein the first module functions to identify the performance anomaly by at least one of:

identifying a deviation of performance of one or more of the set of DS units from an expected DS unit performance trend; and identifying another deviation of the DS processing module from an expected DS processing module performance trend.

10. The DS module of claim 7, wherein the fourth module functions to modify data collection criteria for the one or more of the collection of records of the set of collections of records by at least one of:

adding a log record to one or more records of the collection of records of the set of collections of records, wherein a log record includes one or more of a reporting entity identifier, a state identifier associated with a state of processing, a timestamp corresponding to the state, a state descriptor corresponding to the state, and state parameters corresponding to the state;

adding a statistics record to the one or more records of the collection of records of the set of collections of records, wherein the statistics record includes one or more of a reporting entity identifier, a step identifier associated with a step of processing, a timestamp corresponding to the step, and one or more descriptors corresponding to the step; and modifying persistence of the one or more records of the set of collections of records.

11. The DS module of claim 7, wherein the first record comprises:

identity of the DS processing module;

an event identifier (ID) associated with the processing of the event request;

a parent event ID associated with the event;

information regarding initiation of the processing of the event request; and information regarding completion of the processing of the event request.

12. The DS module of claim 7, wherein one of the plurality of records comprises:

identity of one of the set of DS units;

an event identifier (ID) associated with the processing of a corresponding one of the plurality of sub-event requests by the one of the set of DS units;

a parent event ID associated with the event request;

information regarding initiation of the processing of the corresponding one of the plurality of sub-event requests; and information regarding completion of the processing of the corresponding one of the plurality of sub-event requests.

* * * * *